(12) United States Patent
Walters et al.

(10) Patent No.: US 12,260,326 B2
(45) Date of Patent: Mar. 25, 2025

(54) DATA LABELING FOR SYNTHETIC DATA GENERATION

(71) Applicant: Capital One Services, LLC, McLean, VA (US)

(72) Inventors: Austin Walters, Savoy, IL (US); Jeremy Goodsitt, Champaign, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 1058 days.

(21) Appl. No.: 17/191,254

(22) Filed: Mar. 3, 2021

(65) Prior Publication Data

US 2022/0284280 A1     Sep. 8, 2022

(51) Int. Cl.
*G06N 3/08*     (2023.01)
*G06F 16/23*    (2019.01)
*G06N 3/044*    (2023.01)

(52) U.S. Cl.
CPC .......... *G06N 3/08* (2013.01); *G06F 16/2379* (2019.01); *G06N 3/044* (2023.01)

(58) Field of Classification Search
CPC ....... G06N 3/08; G06N 3/044; G06F 16/2379
See application file for complete search history.

(56) References Cited

U.S. PATENT DOCUMENTS

| | | | |
|---|---|---|---|
| 8,010,357 B2 | 8/2011 | Hakkani-Tur et al. | |
| 9,536,517 B2 | 1/2017 | Williams et al. | |
| 9,582,490 B2 | 2/2017 | Simard et al. | |
| 9,779,081 B2 | 10/2017 | Simard et al. | |
| 10,388,272 B1 | 8/2019 | Thomson et al. | |
| 2010/0217597 A1 | 8/2010 | Begeja et al. | |
| 2017/0060993 A1* | 3/2017 | Pendar | G06F 16/334 |

FOREIGN PATENT DOCUMENTS

| | | |
|---|---|---|
| WO | 2015006630 A2 | 1/2015 |
| WO | 2021138020 A1 | 7/2021 |

OTHER PUBLICATIONS

Brust, C., et al, Active and Incremental Learning with Weak Supervision, Retrieved from internet:<https://link.springer.com/article/10.1007/s13218-020-00631-4> (Year: 2020).*

(Continued)

*Primary Examiner* — Kevin W Figueroa
*Assistant Examiner* — Bart I Rylander
(74) *Attorney, Agent, or Firm* — Banner & Witcoff, Ltd.

(57) ABSTRACT

Aspects described herein may relate to methods, systems, and apparatuses for labeling data in connection with synthetic data generation. The data labeling may begin with a manual process where a user provides labels for data. Based on the labels provided by the user, modified data may be generated and may include one or more encodings associated with the labels provided by the user. A machine-learning model may be trained to predict labels based on the modified data samples. Accuracy of the model may be determined based on comparing the predicted labels to further labels provided by the user and/or by allowing the user to indicate whether predicted labels are correct or incorrect. Once the model is determined to be accurate, the predicted labels may be used as a basis for generating synthetic data.

20 Claims, 15 Drawing Sheets

(56) References Cited

OTHER PUBLICATIONS

Tripathi, S., et al, Learning to Generated Synthetic Data via Compositing, Retrieved from internet:<https://openaccess.thecvf.com/content_CVPR_2019/html/Tripathi_Learning_to_Generate_Synthetic_Data_via_Compositing_CVPR_2019 paper.html> (Year: 2019).*

Assefa, S., et al, Generating synthetic data in finance: opportunities, challenges and pitfalls, Retrieved from Internet:<https://dl.acm.org/doi/abs/10.1145/3383455.3422554> (Year: 2020).*

Majeed, A., et al, Anonymization Techniques for Privacy Preserving Data Publishing: A Comprehensive Survey, Retrieved from Internet:<https://ieeexplore.ieee.org/abstract/document/9298747> (Year: 2020).*

Alfarhan, M., et al, Multiple Events Detection In Seismic Structures Using a Novel U-Net Variant, Retrieved from Internet:<https://ieeexplore.ieee.org/abstract/document/9190682> (Year: 2020).*

Benjdira, B., et al, Unsupervised Domain Adaptation Using Generative Adversarial Networks for Semantic Segmentation of Aerial Images, Retrieved from Internet:<https://www.mdpi.com/2072-4292/11/11/1369> (Year: 2019).*

Efimov, D., et al, Using Generative Adversarial Networks to Synthesize Artificial Financial Datasets, Retrieved from Internet:<https://arxiv.org/abs/2002.02271> (Year: 2020).*

Zhao, Z., et al., Time-weighted LSTM Model with Redefined Labeling for Stock Trend Prediction, Retrieved from Internet:<https://ieeexplore.ieee.org/abstract/document/8372087> (Year: 2017).*

Park, et al, Sensitive Data Identification in Structured Data through GenNER Model based on Text Generation and NER, Retrieved from Internet:<https://repository.hanyang.ac.kr/handle/20.500.11754/186018 (Year: 2020).*

Chai, et al, Human-in-the-loop Techniques in Machine learning, Retrieved from Internet:<chrome-extension://efaidnbmnnnibpcajpcglclefindmkaj/http://sites.computer.org/debull/A20sept/p37.pdf> (Year: 2020).*

Cumby, et al, A Machine Learning Based System for Semi-Automatically Redacting Documents, Retrieved from Internet:<https://ojs.aaai.org/index.php/AAAI/article/view/18851> (Year: 2011).*

Dogan, et al, Click-words: Learning to predict document keywords from a user perspective, Retrieved from Internet:<https://academic.oup.com/bioinformatics/article-abstract/26/21/2767/212598> (Year: 2010).*

Amazon SageMaker Ground Truth, AWS, 5pp, retrieved Feb. 25, 2021. (Year: 2021).*

Clemens-Alexander Brust et al. "Active and Incremental Learning with Weak Supervision" arxiv.org, Cornell University Library, 201 Olin Library Cornell University Ithaca, NY 14853, Jan. 20, 2020, XP081582327, DOI: 10.1007/S13218-020-00631, 15 pages.

Jun. 24, 2022—(WO) International Search Report and Written Opinion—App No. PCT/US2022/018652.

Michel Kana, Natural Language Understanding with Sequence to Sequence Models, Website: Towards Data Science, Sep. 4, 2019, 13pp; https://towardsdatascience.com/natural-language-understanding-with-sequence-to-sequence-models-e87d41ad258b.

Michel Kana, BERT for dummies—Step by Step Tutorial, Website: Towards Data Science, Sep. 14, 2019, 14pp; https://towardsdatascience.com/bert-for-dummies-step-by-step-tutorial-fb90890ffe03.

Denis Antyukhov, Pre-training BERT from scratch with cloud TPU, Website: Towards Data Science, May 9, 2019, 10pp; https://towardsdatascience.com/pre-training-bert-from-scratch-with-cloud-tpu-6e2f71028379.

Jinhyuk L., et al., BioBERT: a pre-trained biomedical language representation model for biomedical text mining, Bioinformatics, vol. 36, Issue 4, Feb. 15, 2020, pp. 1234-1240, https://doi.org/10.1093/bioinformatics/btz682.

Edward Ma, Some examples of applying BERT in specific domain _Towards Data Science, Apr. 3, 2019, 7pp; https://towardsdatascience.com/how-to-apply-bert-in-scientific-domain-2d9db0480bd9.

Prodigy Annotation Flowchart: Named Entity Recognition, 1 page; retrieved Feb. 25, 2021 from https://prodi.gy/prodigy_flowchart_ner-36f76cffd9cb4ef653a21ee78659d366.pdf.

Prodigy 101—everything you need to know • Prodigy • An annotation tool for AI, Machine Learning & NLP, 11pp; retrieved Feb. 25, 2021 from https://prodi.gy/docs.

Ng Wai Foong, Beginner's Guide to Retrain GPT-2 (117M) to Generate Custom Text Content, AI2 Labs,Medium, May 12, 2019, 18pp; https://medium.com/@ngwaifoong92/beginners-guide-to-retrain-gpt-2-117m-to-generate-custom-text-content-8bb5363d8b7f.

Automated Data Labeling With Machine Learning, Azati, Sep. 17, 2020, 13pp; https://azati.ai/automated-data-labeling-with-machine-learning/.

Automate Data Labeling, Amazon SageMaker, 5 pp; retrieved Feb. 25, 2021 from https://docs.aws.amazon.com/sagemaker/latest/dg/sms-automated-labeling.html.

Intro to Labeling Functions,Snorkel, 24pp; retrieved Feb. 25, 2021 from https://www.snorkel.org/use-cases/01-spam-tutorial.

The Hive, Ground Truth Gold—Intelligent data labeling and annotation, The Hive, Medium, Mar. 20, 2018, 7pp; https://medium.com/hivedata/ground-truth-gold-intelligent-data-labeling-and-annotation-632f63d9662f Harrison Miller, Labeling, transforming, and structuring training data sets for machine learning with Snorkel, Medium, Jan. 18, 2020, 4pp; https://medium.com/@harrison.miller13_28580/labeling-transforming-and-structuring-training-data-sets-for-machine-learning-with-snorkel-d4813e2aad74.

Cheng J., et al., Flock: Hybrid Crowd-Machine Learning Classifiers, Proc. 18th ACM Conf. Computer Supported Cooperative Work & Social Computing (CSCW '15), Association for Computing Machinery, New York, NY, 2015, 600-611. DOI:https://doi.org/10.1145/2675133.2675214 [https://hci.stanford.edu/publications/2015/Flock/flock_paper.pdf].

Ratner A., et al., Training Complex Models with Multi-Task Weak Supervision, arXiv:1810.02840v2 [stat.ML] Dec. 7, 2018, 31 pages; [https:/arxiv.org/pdf/1810.02840.pdf].

Jesus Rodriguez, Introducing Snorkel, Towards Data Science, Jan. 30, 2109, 7 pp; https://web.archive.org/web/20200512052520/https://towardsdatascience.com/introducing-snorkel-27e4b0e6ecff?gi=fdfc97db8a68.

* cited by examiner

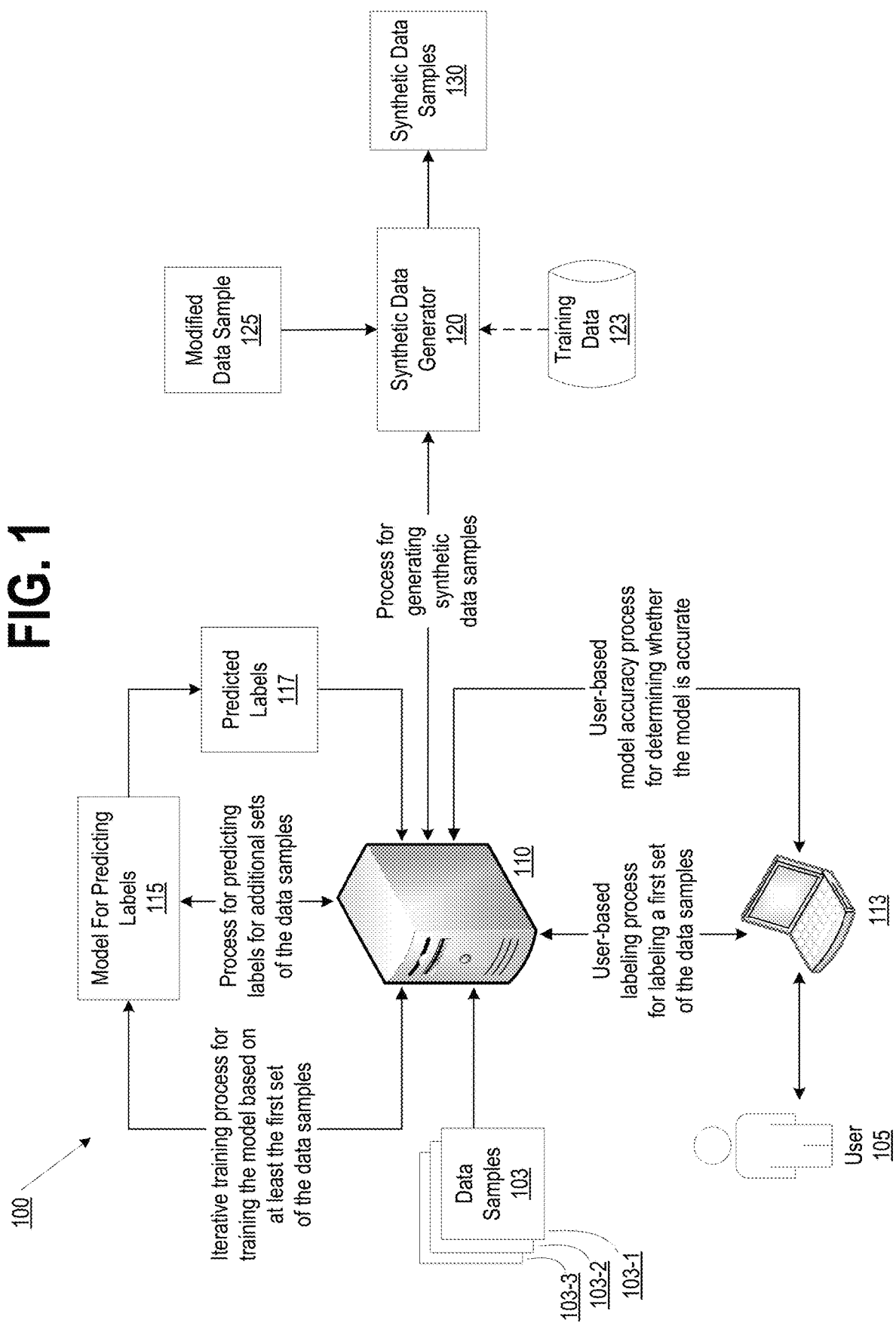

Example Data Sample 205
(Original Email With Underlining Added for Emphasis)

From: JMS@first-email-domain.com
Sent: Tuesday, June 25, 2020 4:00 PM
To: MC@second-email-domain.com
Subject: Following up on your account Hi, Matthew Clark, Please call us at 555-555-5555 if you want to discuss the details of your account number 123-987.

Regards,
John Michael Scott 207
209

Process for modifying a data sample →

Example Modified Data Sample 210
(Modified Email With Label Encodings)

From: <<email_address>>
Sent: <<day_of_week>>, <<date>> <<time>>
To: <<email_address>>
Subject: Following up on your account Hi, <<first_name>> <<last_name>>, Please call us at <<phone_number>> if you want to discuss the details of your account number <<account_number>>.

Regards,
<<first_name>> <<middle_name>> <<last_name>>

Process for training the model to predict labels associated with email data →

Model 115

FIG. 2A

Example Data Sample 205
(Original Email With Underlining Added for Emphasis)

From: JMS@first-email-domain.com
Sent: Tuesday, June 25, 2020 4:00 PM
To: MC@second-email-domain.com
Subject: Following up on your account Hi, Matthew Clark, Please call us at 555-555-5555 if you want to discuss the details of your account number 123-987.

Regards,
John Michael Scott

*Process for modifying a data sample* →

Additional Example Modified Data Sample 225
(Modified Email With Blank Encodings)

From: [Blank]
Sent: [Blank], [Blank] [Blank]
To: [Blank]
Subject: Following up on your account Hi, [Blank] [Blank], Please call us at [Blank] if you want to discuss the details of your account number [Blank].

Regards,
[Blank] [Blank] [Blank]

Set of Labels 230
(Ordered List Corresponding to Blank Encodings)

email address,
day of week,
date,
time,
email address,
first name,
last name,
phone number,
account number,
first name,
middle name,
last name

*Process for training the model to predict labels associated with email data* →

Model 115

Model Accuracy User Interface

*Please indicate whether each predicted label is correct or incorrect*

*Predicted label:* email address | Correct |

From: RTB@third-email-domain.com
Sent: Wednesday, June 26, 2020 3:37 PM
To: TR@fourth-email-domain.com
Subject: Brief check-in on your account Hi, Todd Russell,

317

*Predicted label:* account number | Correct | Incorrect | ~318

Please call us at 444-444-4444 if you want to discuss the details of your account number 987-123.

316

Regards,
Ryan Barrington

FIG. 3C

Synthetic Data User Interface 320

*Please indicate whether the synthetic data sample is correct or incorrect*

[ Correct ]  [ Incorrect ]  ~ 323

From: DMP@third-email-domain.com
Sent: Wednesday, December 11, 2019 1:32 AM
To: ADJ@fourth-email-domain.com
Subject: Following up on your account Hi, Anne Johnson, At your earliest convenience, please call us at 555-555-1234, so we can discuss the details of your account 456789-54321.

Regards,
David Mason Phillips

FIG. 3D

DATA LABELING FOR SYNTHETIC DATA GENERATION

FIELD

Aspects described herein relate generally to machine-learning models, data labeling, and synthetic data generation.

BACKGROUND

Implementing a machine-learning model so that it is suitable for its intended purpose may be a time consuming and challenging process. The time consuming and challenging nature of implementing a machine-learning model may be illustrated by the numerous difficulties in training the machine-learning model and determining whether the machine-learning model is accurate. For example, training may require training data that is of sufficient volume and that is of sufficient quality. A sufficient volume of training data may be inaccessible or may not exist. Even if a sufficient volume of training data exists and is accessible, the training data may not be of sufficient quality. As a particular example, if the training is performed based on labeled training data, the quality of the labels may depend on both whether enough of the labels are correct and whether the labels are correct or incorrect in a consistent manner Ensuring that the training data satisfies both conditions of correctness and consistency may be time-intensive. Even if the training data is of sufficient volume and of sufficient quality, the training may be time intensive to perform. Once the machine-learning model is trained, determining whether the machine-learning model's output is accurate may bring even further challenges. Determining whether the machine-learning model's output is accurate may be part of a process for validating the machine-learning model. Additional data, which is different from the training data, is often needed to perform the process for validating the machine-learning model. This additional data may be inaccessible or may not exist. The validation may require some basis for determining whether the data output by the machine-learning model is accurate, and may be time intensive to perform. The above examples are only some of the difficulties that may illustrate the time consuming and challenging process of implementing a machine-learning model.

SUMMARY

The following paragraphs present a simplified summary of various aspects described herein. This summary is not an extensive overview, and is not intended to identify key or critical elements or to delineate the scope of any claim. This summary merely presents some concepts in a simplified form as an introductory prelude to the more detailed description provided below.

Aspects described herein may address the above-mentioned challenges and difficulties, and generally improve the quality and quantity of data that is available for training a machine-learning model. Further, aspects described herein may address one or more challenges and difficulties in labeling data, training a machine-learning model using labeled data, determining an accuracy of the machine-learning model, and/or using output of the machine-learning model to generate synthetic data. The synthetic data, for example, may be used to train another machine-learning model, used to validate another machine-learning model, or the like.

Aspects described herein relate to the training of a machine-learning model based on labels provided by a user, the use of the machine-learning model for generating predicted labels, and the use of the predicted labels for generating synthetic data. For example, a user-based labeling process for labeling data samples may be initiated. The user-based labeling process may include a user providing labels for one or more sets of the data samples. As the labels for the one or more sets are received, a machine-learning model may be iteratively trained based on the labels. The determination as to whether the iterative training of the machine-learning model should continue or stop may be based on comparing predicted labels output by the machine-learning model to one or more additional labeled sets of the data samples. If the training is not to continue, the user-based labeling process may be stopped and a user-based model accuracy process may be initiated. The user-based model accuracy process may include a user providing an indication of whether predicted labels output by the machine-learning model are correct or incorrect. Based on this indication, a determination may be performed as to whether the machine-learning model is sufficiently accurate. If the machine-learning model is sufficiently accurate, additional predicted labels output by the machine-learning model may be used as a basis for generating one or more synthetic data samples.

These features, along with many others, are discussed in greater detail below. Corresponding apparatus, systems, and computer-readable media are also within the scope of the disclosure.

BRIEF DESCRIPTION OF THE DRAWINGS

The present disclosure is illustrated by way of example and not limited in the accompanying figures in which like reference numerals indicate similar elements and in which:

FIG. 1 depicts a block diagram of an example computing environment that may be configured to label data, implement a machine-learning model, and generate synthetic data in accordance with various aspects described herein.

FIG. 2A-2D depict examples of data that may be used and/or generated in connection with various aspects described herein.

FIGS. 3A-3D depict example graphical interfaces that may be displayed in accordance with various aspects described herein.

DETAILED DESCRIPTION

Figure 2C:
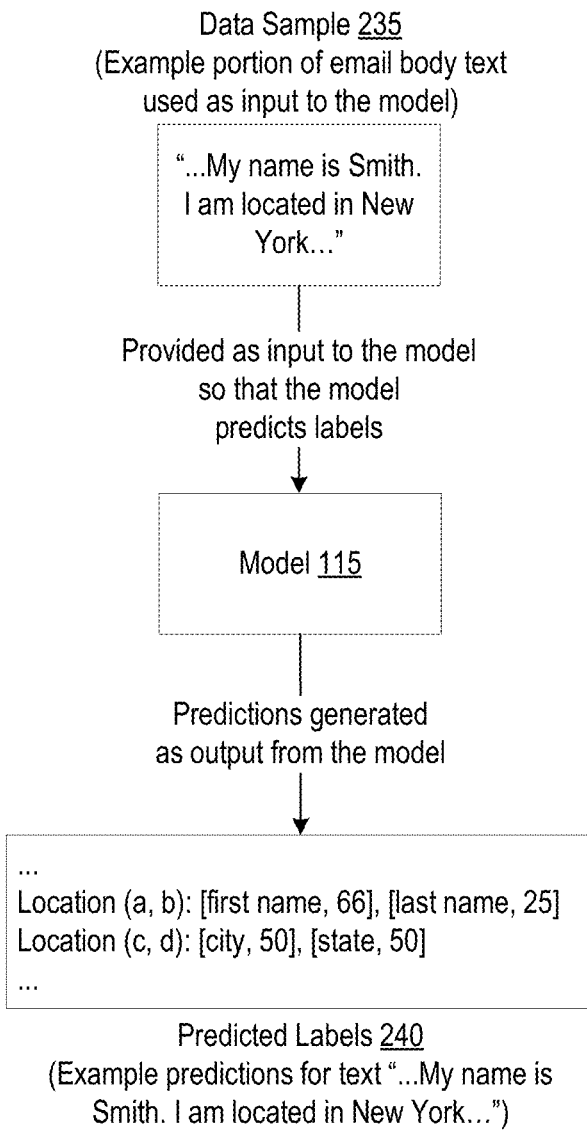

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Throughout this disclosure, the phrases "confidential information" and "confidential data" are used and may refer to any information or data that is subject to confidentiality procedures that restrict access and/or restrict disclosure of the confidential information or confidential data. Examples of confidential information or confidential data may include account numbers, social security numbers, and the like. As an example of a confidentiality procedure, the confidential information or confidential data may be prevented from being disclosed to any user that does not have appropriate access rights. The confidentiality procedures may be defined by one or more data security policies. For example, an enterprise may implement data security policies that restrict access to account numbers or other customer information. The confidentiality procedures may be based on one or more legal or regulatory requirements. For example, social security numbers may be subject to one or more confidentiality procedures based on one or more United States Federal laws or regulations.

Additionally, throughout this disclosure, the phrases "synthetic data", "synthetic data sample", and "synthetic data samples" are used and may refer to data that is artificially generated rather than data that is generated based on a real-world phenomenon or a real-world event. Data generated based on a real-world phenomenon or a real-world event is often obtained by direct measurement or direct observation of the real-world phenomenon or the real-world event. In this way, synthetic data may also be referred to as data that is not obtained by direct measurement or direct observation. As will become apparent in view of the many examples discussed throughout this disclosure, synthetic data may be generated to be different from data obtained by direct measurement or direct observation in one or more specific ways. For example, data obtained by direct measurement or direct observation may include confidential information. Synthetic data may be generated to not include the confidential information. Even with differences from data obtained by direct measurement or direct observation, the synthetic data may be indistinguishable from data obtained by direct measurement or direct observation. For example, the data obtained by direct measurement or direct observation may include financial information that resulted from activity of an account holder (e.g., a transaction record for the account holder's credit card account). The financial information may include confidential information such as the account holder's account number. Synthetic data may be generated to not include the account holder's account number. In place of the account holder's account number, the synthetic data may include a generated account number. In this way, the synthetic data may be indistinguishable from financial information that resulted from actual account holder activity.

By way of introduction, aspects discussed herein may relate to methods and techniques for labeling data, training a machine-learning model based on labeled data, and generating synthetic data based on predicted labels output by the machine-learning model. The methods and techniques described herein, and/or various combinations of the features described herein, may improve data labeling processes, processes for training a machine-learning model, processes for determining accuracy of a machine-learning model, and/or processes for generating synthetic data. Further, by improving the above processes, the ability to train and/or validate other machine learning models may be improved (e.g., by increasing the availability of synthetic data). A machine-learning model may be referred interchangeably herein as a model. The methods and techniques described herein include, among other things, a user-based process for labeling data samples, an iterative training process for training a model that is configured to predict labels, a process for predicting labels using the model, a user-based model accuracy process for determining whether the model is accurate, and a process for generating synthetic data samples based on predicted labels output by the machine-learning model. Further, the transitions between these various processes may be seamless to a user. For example, based on determining to not continue the iterative training process, the user-based labeling process may be stopped and the user-based model accuracy process may be initiated immediately. In this way, the user may quickly transition from labeling the data samples as part of the user-based model labeling process to viewing predicted labels output by the model as part of the user-based model accuracy process. Further, once the model is determined to be sufficiently accurate, predicted labels output by the model can be used as a basis for generating synthetic data. The details of these methods and techniques, among other aspects, will be described in more detail herein.

FIG. 1 depicts a block diagram of an example computing environment 100 that may be configured to label data, implement a model that is configured to predict labels, and generate synthetic data based on the predicted labels. As a brief overview, the example computing environment 100 includes a server 110 that may receive data samples 103 and may perform various processes with other components of the example computing environment 100. As depicted, the other components include a user computing device 113, a model 115 for predicting labels, and a synthetic data generator 120.

The server 110 may be configured to implement the model 115 and the synthetic data generator 120. Alternatively, the model 115 and the synthetic data generator 120 may be implemented in one or more computing devices different from the server 110. Further, while the server 110 is depicted in FIG. 1 as being a single computing device for simplicity, the processes performed by the server 110 may be performed by one or more computing devices.

The user computing device 113 may be a computing device that is able to display information to and receive input from a user 105. For example, the user computing device 113 may be a laptop computer, a personal computer, or a tablet computer. The user computing device 113 may be able to communicate with the server 110 via a network (e.g., a local area network or a wide area network).

The model 115 may be any suitable machine-learning model that is configured to be used to generate predicted labels based on one or more of the data samples 103. For example, the model 115 may be a transformer, a convolutional network architecture, a recurrent neural network architecture, a deep neural network, a Variational autoencoder (VAE), or a combination of the aforementioned model types. Examples of a suitable recurrent neural network architecture include a long short-term memory (LSTM) and a Gated Recurrent Unit (GRU). Additionally, the model 115 itself may not be configured to generate the predicted labels themselves. The model may be configured to generate data indicative of predicted labels. The server 110 may process the data indicative of predicted labels, which was generated by the model 115, to translate or convert that data to a more human-readable form (e.g., translate or convert the data generated by the model 115 to a text string that provides the predicted labels in the English language).

The synthetic data generator 120 may be configured to generate synthetic data samples 130. The synthetic data generator 120 may include one or more machine learning models (e.g., one or more neural networks) that are trained to generate one or more synthetic data samples 130. The one or more machine-learning models of the synthetic data generator 120 may be trained based on training data 123. The training data 123 may include data different from the data samples 103, but may be of the same type as the data samples 103 (e.g., if the data samples 103 include textual data, the training data 123 may include additional textual data; if the data samples 103 include image data, the training data 123 may include additional image data). Further, the training based on the training data 123 may have been performed prior to the server 110 receiving the data samples 103. In this way, the synthetic data generator 120 may be pre-configured and waiting to receive input for generating synthetic data at a time when the server 110 receives the data samples 103.

The server 110 and the other components of the example computing environment 100 are depicted in FIG. 1 as being used to perform various processes in connection with labeling the data samples 103, training the model 115, determining an accuracy of the model 115, and generating one or more synthetic data samples 130. The server 110 and the user computing device 113 may be used in connection with performing a user-based labeling process for labeling the first set 103-1 of the data samples 103. The server 110 and the model 115 may be used in connection with performing an iterative training process for training the model 115 based on at least the first set 103-1 of the data samples 103. Additionally, the server 110 and the model 115 may be used in connection with performing a process for predicting labels of additional sets of the data samples 103. The model 115 and the user computing device 113 may be used in connection with performing a user-based model accuracy process for determining whether the model 115 is accurate. The server 110 and the synthetic data generator 120 may be used in connection with a process for generating synthetic data samples 130. The server 110 and the other components of the example computing environment 100 may perform other processes not explicitly shown by FIG. 1. For example, the server 110 may perform a process for modifying one or more of the data samples 103 that results in a modified data sample. Examples and further details of these processes will be discussed below.

FIGS. 2A-2D depict examples of data that may be used and/or generated in connection with labeling data, training a model, determining accuracy of the model, and/or generating synthetic data samples. FIGS. 3A-3D depict example user interfaces that may be used in connection with labeling data, training a model, determining accuracy of the model, and/or generating synthetic data samples.

To begin the examples that combine the example computing environment 100 of FIG. 1 and FIGS. 2A-2D and 3A-3D, the server 110 may receive the data samples 103. The data samples 103 may include various types of data including, for example, numeric data, textual data, image data, audio data, and the like. The types of data included by the data samples 103 may be formatted for specific records of information. As some examples, the types of data included by the data samples 103 may be formatted as email data, customer record data, call log data, account information, chat log data, transaction data. Further, the data samples 103 may be organized into one or more sets. For example, as depicted in the example computing environment 100, the data samples 103 includes a first set 103-1 of the data samples 103, a second set 103-2 of the data samples 103, and a third set 103-3 of the data samples 103. Each set of the data samples 103 may include its own, different portion of the data samples 103. For example, if the data samples 103 includes 75 emails, the first set 103-1 of the data samples 103 may include the first 25 emails, the second set 103-2 of the data samples 103 may include the second 25 emails, and the third set 103-3 of the data samples 103 may include the third 25 emails.

FIG. 2A depicts an example data sample 205. In particular, the example data sample 205 includes at least a portion of an original email. An email may include header data (e.g., header data 207 of the original email) and other forms of metadata. The header data may include various fields (e.g., From, Sent, To, and Subject fields of the header data 207). An email may include body data (e.g., body data 209 of the original email) with text and/or images (e.g., the body data 209 includes a salutation "Hi, Matthew Clark,"; a paragraph of text with a phone number and an account number; a closing "Regards,"; and a name of the sender "John Michal Scott").

For purposes of providing an example from receipt of the data samples 103 by the server 110 to the generation of the synthetic data samples 130, the example data sample 205 will be assumed as one of the first set 103-1 of the data samples 103. Accordingly, as depicted in FIG. 1, the server 110 and the user computing device 113 may perform a user-based labeling process where the user 105 provides input, via the user computing device 113, that indicates labels for the first set 103-1 of the data samples 103. As part of this process, the user 105 may provide input, via the user computing device 113, that indicates labels for the example data sample 205. Accordingly, the user-based labeling process may include displaying the example data sample 205 to the user 105; receiving input that indicates a portion of the example data sample 205 (e.g., the user 105 may drag, via a mouse or touch screen, a cursor across text to highlight a portion of the example data sample); and receiving second input that indicates a label for the indicated portion (e.g., the user 105 may type, via a keyboard, a label for the highlighted text).

Figure 3A:
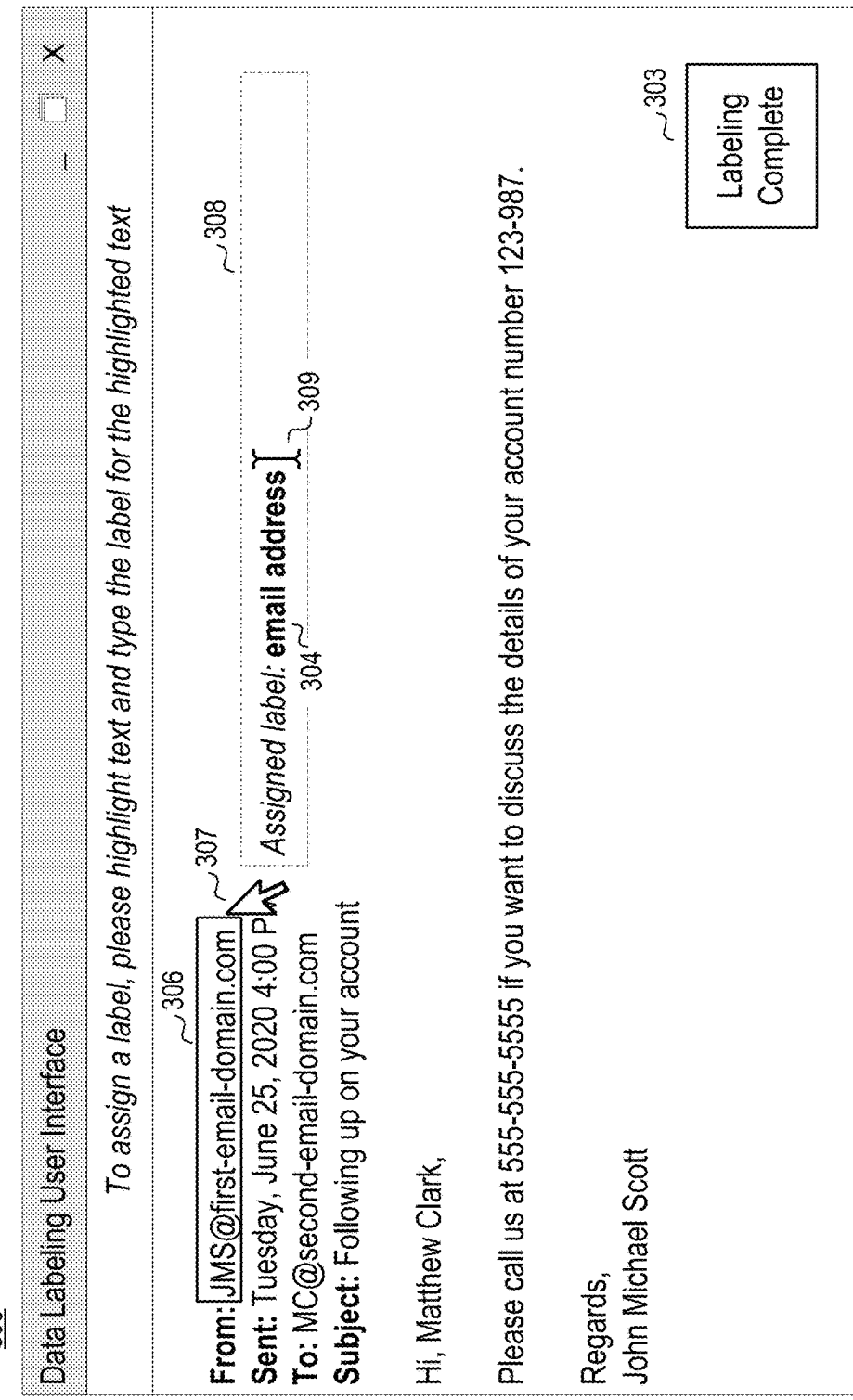

An example in connection with the user-based labeling process is illustrated at FIG. 3A, which depicts an example graphical interface 305. Example graphical interface 305 may be configured to allow the user 105 to provide input indicative of one or more labels for the example data sample 205. As depicted in FIG. 3A, the user 105 may, by pressing and dragging pointer 307 across the text, select "JMS@first-email-domain.com" for labeling. The graphical interface 305 may display an indication 306 of the selection of "JMS@first-email-domain.com" for labeling. The indication 306 may be a box around the text, a highlighting of the text, an underlining of the text, or the like. After the user 105 has completed the pressing and dragging of pointer 307, the graphical interface 305 may display a prompt 308 that allows the user 105 to input the label for the selected text of "JMS@first-email-domain.com". As depicted in FIG. 3A, the user 105 has input, based on cursor 309, the label of "email address" 304 for "JMS@first-email-domain.com".

In view of the illustration provided by FIG. 3A, the user 105 may, as part of the user-based labeling process, input or otherwise indicate labels for various portions of the header data 207 and the body data 209 of the example data sample 205. For example, the user 105 may input labels for text found in the From, Sent, and To fields of the header 207; the name in the salutation of the body data 209, the phone number of the body data 209; the account number of the body data 209; and the name following the email closing. Particular examples where the user 105 may input labels for various portions of the of the header data 207 and the body data 209 of the example data sample 205 are shown in underlining at the example data sample 205.

Once the user 105 has finished inputting labels for the example data sample 205, the user 105 may, after moving pointer 307 to a location over the button 303, press the button 303 to indicate that labeling of the example data sample 205 is complete. Based on pressing the button 303, the labels for the example data sample 205 may be stored for later access (e.g., by the server 110 receiving and storing the labels for the example data sample 205). Storing the labels may include, for each label, storing the text input by the user 105 (e.g., "email address") and an indication of which portion of the example data sample 205 is being labeled (e.g., "JMS@first-email-domain.com"). Further, based on pressing the button 303, the computer 113 may display the next data sample in the first set 103-1 of the data samples 103. Based on this new display, the user 105 may input labels for this next data sample similar to the illustration of FIG. 3A. Eventually, the user 105 may input labels for all data samples in the first set 103-1 of the data samples 103, which may complete the user-based labeling process for the first set 103-1 of the data samples 103.

After the user-based labeling process for the first set 103-1 of the data samples 103 is complete, the server 110 may perform a process for modifying the first set 103-1 of the data samples 103. This process may be performed based on the labels provided by the user 105 for the first set 103-1. For example, this process may modify each data sample of the first set 103-1 by replacing one or more portions of each data sample that have been labeled with encoded data. This process may result in a modified set of data samples, wherein each data sample has been modified to include one or more encodings. A modified set of data samples may be interchangeably referred to as a set of modified data samples. A modified data sample may be used for various purposes. For example, a modified data sample may be used as input to the model 115 (e.g., as part of the iterative training process for training the model 115) and/or as input to the synthetic data generator 120 (e.g., modified data samples 125 may be provided as input to the synthetic data generator 120 as part of the process for generating the synthetic data samples 130).

FIGS. 2A and 2B depict two different examples modified data samples. In particular, FIG. 2A depicts an example modified data sample 210 and FIG. 2B depicts an additional example modified data sample 225. The two example modified data samples result from using different encoding schemes. For the example modified data sample 210, the encoded data indicates the labels of the replaced portions. The example modified data sample 210 may result from modifying the example data sample 205 based on an encoding scheme that replaces one or more labeled portions with one or more encodings of the labels. In this way, for example, the example modified data sample 210 includes the encoding of <<email_address>> in place of the text "JMS@first-email-domain.com". For the additional example modified data sample 225, the encoded data indicates that one or more labeled portions have been removed from the data sample. The additional example modified data sample 225 may result from modifying the example data sample 205 based on an encoding scheme that replaces one or more labeled portions with one or more encodings that indicate removal of the one or more labeled portions. In this way, for example, the additional example modified data sample 225 includes the encoding of [Blank] in place of the text "JMS@first-email-domain.com".

As depicted by the modified data sample 210, an example encoding may include text that is based on the label provided by the user 105 and that is between <<and>>. By comparing the example data sample 205 and the example modified data sample 210, examples of the replaced portions, the inserted encodings, and the labels input by the user 105 are all illustrated by FIG. 2A. For example, "JMS@first-email-domain.com" has been replaced with an encoding of <<email_address>>, which indicates the user 105 provided a label of "email address" for that portion of the example data sample 205. Similarly, the name "John Michael Scott", which follows the email closing, has been replaced with three separate encodings of <<first_name>> <<middle_name>> and <<last_name>>. The three separate encodings indicate that the user 105 provided labels for each of "John", "Michael", and "Scott". Further, the user 105 provided multiple instances of certain labels (e.g., "Michael" and "John" were both provided labels of "first name" by the user 105; "Clark" and "Scott" were both provided labels of "last name" by the user 105), and the example modified data sample 105 includes an encoding for each of the multiple instances. Any remaining data sample in the first set 103-1 may be modified in a similar fashion. The encoding of the label between <<and>> is only one of the encoding schemes that could be used to modify the data sample based on an encoding scheme that replaces one or more labeled portions with one or more encodings of the labels.

As depicted by the additional modified data sample 225, an example encoding may include the text of "Blank" between open brackets, [, and closed brackets,]. The labels themselves are included in a set of labels 230 for the additional example modified data sample 225. As depicted in FIG. 2B, the set of labels 230 includes an ordered list of labels that corresponds to each encoding inserted into the additional modified data sample 225. By comparing the example data sample 205 and the additional example modified data sample 225, examples of the replaced portions, the inserted encodings, and the labels input by the user 105 are all illustrated by FIG. 2B. For example, "JMS@first-email-domain.com" has been replaced with an encoding of [Blank], which corresponds to the first entry in the set of labels 230. The first entry in the set of labels 230 is "email address", which indicates the label for that portion of the example data sample 205. Similarly, the name "John Michael Scott", which follows the email closing, has been replaced with three separate encodings of [Blank]. The three separate encodings indicate that the user 105 provided labels for each of "John", "Michael", and "Scott". The labels for each of "John", "Michael", and "Scott" are found at the corresponding location in the set of labels 230 (e.g., "first name", "middle name", and "last name"). Further, the user 105 provided multiple instances of certain labels (e.g., "Michael" and "John" were both provided labels of "first name" by the user 105; "Clark" and "Scott" were both provided labels of "last name" by the user 105), and the set of labels 230 includes an entry for each of the multiple instances. Any remaining data sample in the first set 103-1 may be modified in a similar fashion. The encoding of the text "Blank" between open and closed brackets is only one of the encoding schemes that could be used to modify the data sample based on an encoding scheme that indicates removal of one or more labeled portions.

By modifying a data sample, confidential information may be removed from the data sample. Both FIGS. 2A and 2B depict modified data samples where confidential information may have been removed. For example, if account numbers and phone numbers are confidential information, modifying the example data sample 205 may result in the removal of the characters of the phone number, 555-555-5555, and the characters of the account number, 123-987. The characters of the phone number and the characters of the account number may have both been replaced by encoded data. This removal and replacement is shown by the example modified data sample 210, which includes <<phone_number>> in place of 555-555-5555 and <<account_number>> in place of 123-987. This removal and replacement is shown by the additional example modified data sample 225, which includes [Blank] in place of 555-555-5555 and [Blank] in place of 123-987. Because the confidential information has been removed, modified data samples could be sent, accessed, and/or used without needing to enforce any confidentiality procedure associated with the phone number and/or the account number. One example way in which the example modified data sample 210 and/or the additional modified example data sample 225 could be used based on the removal of confidential information is as part of a public repository for labeled email data.

After the process for modifying the first set 103-1 of the data samples 103 is complete, the server 110 may have generated a first modified set of data samples. The server 110 may initiate or otherwise perform an iterative training process for the model 115 using this first modified set of data samples. The model 115 may be configured based on the type of data sample that the model 115 is to process. For example, if the data samples 103 include text data and/or image data, the model 115 may be configured to be used to generate predicted labels based on the text data and/or the image data. More particularly, if the data samples 103 include text data, the model 115 may be configured to process text data at the character level, word level, sentence level, paragraph level, or other level associated with text data. If the data samples 103 include image data, the model 115 may be configured to process the image data at the object level, segmentation level, or other level associated with image data. Additionally, at a time when the server 110 receives the data samples 103, the model 115 may be untrained. Alternatively, at a time when the server 110 receives the data samples 103, the model 115 may have been pre-trained using other data different from the data samples 103. In this way, the iterative training process may be performed with respect to an untrained model or a pre-trained model.

The iterative training process may include training the model 115 using the first modified set of the data samples. For example, the model 115 may be trained based on the example modified data sample 210, and/or the additional example modified data sample 225 and the set of labels 230. In this way, the model 115 is trained based on the first set 103-1 of the data samples 103, but in a way that does not directly use the first set 103-1 of the data samples 103 in the training process. The model 115 may be configured to predict labels associated with particular formats of data. For example, the model 115 may be trained to predict labels associated with email data. Consequently, the model 115 may be trained using modified data samples that are commonly formatted according to the particular configuration of the model 115 (e.g., all modified data samples may be formatted as email data). The technique used for training the model 115 may be any suitable training technique and may depend on the type of model being implemented. For example, a training technique for a transformer may be different from a training technique for a convolutional network, and a training technique for a recurrent neural network architecture may be different from both training techniques for the transformer and the convolutional network.

Using the first modified set of data samples to train the model 115 may be one iteration of the iterative training process for the model 115. For example, the iterative training process may be performed on a per-set basis. As the user 105 completes labeling an additional set of the data samples 103, the server 110 may generate an additional set of modified data samples, and perform another iteration of the training process using the additional set of modified data samples. In relation to FIG. 1, the user-based labeling process may be performed for the second set 103-2 of the data samples 103, a process for modifying each data sample of the second set 103-2 may be performed similar to how the first 103-1 was modified, and the iterative training process may perform a second iteration by training the model 115 based on each modified data sample for the second set 103-2. FIGS. 4A-4D and FIG. 5 provide additional examples where the iterative training process may be performed on a per-set basis.

The server 110 may, after each iteration of the iterative training process, determine whether to continue or stop the iterative training process for the model 115. This determination may be performed based on a comparison between labels provided by the user 105 and predicted labels 117 generated by the model 115. The predicted labels 117 may be generated based on performance of the process for predicting labels for additional sets of the data samples. For example, as the user-based labeling process is performed for the second set 103-2 of the data samples 103, the server 110 may provide the second set 103-2 as input to the model 115. In this way, labels for the second set 103-2 that were provided by the user 105 during the user-based labeling process for the second set 103-2 may be compared to predicted labels generated by the model 115 for the second set 103-2. Details on this comparison and determining whether to continue or stop the iterative training process for the model 115 are provided below following a discussion on using the model 115 to generate predicted labels.

Once one or more iterations of the iterative training process is complete, the model 115 may be used to generate predicted labels 117. Predicted labels 117 may include data that indicates potential labels and confidence values associated with the potential labels. For example, the model 115 may receive, as input, a data sample and may generate, as output, one or more predictions for the data sample. A prediction may be for a specific location in the data sample. Further, the prediction may include one or more potential labels for the specific location and one or more confidence values for the one or more potential labels. An illustration of using the model 115 to generate predictions is provided in FIG. 2C. As depicted in FIG. 2C, the model 115 receives, as input, a data sample 235 formatted as email data. FIG. 2C shows an example portion of the data sample 235. Specifically, the example portion includes the text "My name is Smith. I am located in New York". The model 115 may process the received data sample and generate predicted labels 240 for the received data sample. FIG. 2C shows, as part of the predicted labels 240, example predictions for the example portion of the data sample 235.

Specifically, the examples of predicted labels 240 include a first example prediction of "Location (a, b): [first name, 66], [last name, 25]" for the text "Smith" and a second example prediction of "Location (c, d): [city, 50], [state, 50]" for the text "New York". For the first example prediction, "Location (a, b)" may indicate the location of "Smith" in the data sample (e.g., a may indicate the location of the first character from "Smith", S; and b may indicate the location of the last character from "Smith", h). Continuing with the first example prediction, [first name, 66] may indicate a potential label of "first name" for "Smith" with a confidence value of 66. Finally for the first example prediction, [last name, 25] may indicate a potential label of "last name" for "Smith" with a confidence value of 25. In this way, the model 115 may be predicting with more confidence that "Smith" should be labeled with "first name" instead of "last name" For the second example prediction, "Location (c, d)" may indicate the location of "New York" in the data sample (e.g., C may indicate the location of the first character from "New York", N; and d may indicate the location of the last character from "New York", k). Continuing with the second example prediction, [city, 50] may indicate a potential label of "city" for "New York" with a confidence value of 50. Finally for the second example prediction, [state, 50] may indicate a potential label of "state" for "New York" with a confidence value of 50. In this way, the model 115 may be predicting that "New York" should be labeled as "city" or "state" with equal confidence.

As depicted in FIG. 2C, the examples of the predicted labels 240 includes, for each prediction, two potential labels. The two potential labels are shown for simplicity. Generally, a prediction generated by the model 115 may include one or more potential labels (e.g., more or fewer than the depicted two potential labels). For example and with respect to the first example prediction, the model 115 may have generated additional potential labels such as "city" or "middle name" for "Smith" (e.g., [city, 5] for "city"; and [middle name, 10] for "middle name"). The exact number of potential labels may depend on the configuration of the model 115. Additionally, the example predictions of FIG. 2C are provided in an example format for simplicity. Predictions generated by the model 115 may be formatted in various different ways, while still providing indications of potential labels, confidence values for the potential labels, and locations associated with the potential labels.

As discussed herein, the server 110, as part of determining whether to continue or stop the iterative training process for the model 115, may perform a comparison between predicted labels 117 generated by the model 115 and labels provided by the user 105. This comparison may be performed on a per-data sample basis. For example, this comparison may include comparing one or more predicted labels generated by the model 115 for a data sample from the second set 103-2 to one or more labels provided by the user 105 for the data sample from the second set 103-2. In this way, the server 110 may, based on the comparison, count how many instances the one or more predicted labels differ from the one or more labels provided by the user 105 and/or count how many instances the one or more predicted labels match the one or more labels provided by the user 105. Determining whether to continue or stop the iterative training process for the model 115 may be based on these counts. For example, the server 110 may determine to stop the iterative training process for the model 115 if the count of instances where the one or more labels provided by the user 105 differ from the one or more predicted labels is less than a first threshold. Otherwise, the server 110 may determine to continue the iterative training process for the model 115. As another example, the server 110 may determine to stop the iterative training process for the model 115 if the count of instances where the one or more labels provided by the user 105 match the one or more predicted labels is greater than a second threshold. Otherwise, the server 100 may determine to continue the iterative training process for the model 115.

The determination whether to continue or stop the iterative training process for the model 115 may be performed on a per-set basis. As the user 105, via the user-based labeling process, is providing labels for additional sets of the data samples 103, the server 110 may be performing a process for predicting labels for the additional sets of the data samples 103. These additional sets, for example, may be the second set 103-2 and the third set 103-3 of the data samples 103. Once the user 105 completes labeling an additional set of the data samples 103 and the model 115 outputs predicted labels for the additional set of the data samples 103, the server 110 may determine whether to continue or stop the iterative training process for the model 115 based on a comparison between the labels provided by the user 105 for the additional set and the predicted labels generated by the model 115 for the additional set. In this way, the server 110 may determine to stop the iterative training process for the model 115 if the count of instances where the one or more labels provided by the user 105 for the additional set differ from the predicted labels for the additional set is less than a first threshold. Otherwise, the server 110 may determine to continue the iterative training process for the model 115. As another example, the server 110 may determine to stop the iterative training process for the model 115 if the count of instances where the one or more labels provided by the user 105 for the additional set match the predicted labels for the additional set is greater than a second threshold. Otherwise, the server 110 may determine to continue the iterative training process for the model 115.

Example comparisons between one or more predicted labels generated by the model 115 and one or more labels provided by the user 105 can be discussed based on the examples of the predicted labels 240 depicted in FIG. 2C. For these examples, the data sample 235 of FIG. 2C that was provided as input to the model 115 may be assumed to be from the second set 103-2 of the data samples 103. Further, the data sample 235 of FIG. 2C may be assumed to have been labeled by the user 105 as part of the user-based labeling process for the second set 103-2. Accordingly, the label provided by the user 105 for "Smith" may be compared to the predicted labels 240 generated by the model 115 for "Smith". In other words, the label provided by the user 105 for "Smith" may be compared to the first example prediction of FIG. 2C ("Location (a, b): [first name, 66], [last name, 25]"). The comparison may result in determining whether the label provided by the user 105 differs or matches the potential labels of the first example prediction.

The comparison may result in determining whether the label provided by the user 105 differs or matches the potential labels of the first example prediction based on whether the label provided by the user 105 matches any one of the potential labels. For example, if the user 105 provided a label of "first name" for "Smith", then the comparison may result in determining that the label provided by the user 105 matches the potential labels of the first example prediction (e.g., based on the first example prediction including "[first name, 66]"). If the user 105 provided a label of "middle name" for "Smith", then the comparison may result in determining that the label provided by the user 105 differs from the potential labels of the first example prediction (e.g., based on the first example prediction not including "[middle name, X]" where X is any confidence value).

Additionally, the comparison may result in determining whether the label provided by the user 105 differs or matches the potential labels of the first example prediction based on the first example prediction's confidence values. For example, the comparison may be performed based on matching the label provided by the user 105 to the potential label having the highest confidence value. In this way, if the user 105 provided a label of "first name" for "Smith", then the comparison may result in determining that the label provided by the user 105 matches the potential labels of the first example prediction (e.g., based on the first example prediction including "[first name, 66]" and that potential label having the highest confidence value for the first example prediction). If the user 105 provided a label of "last name" for "Smith", then the comparison may result in determining that the label provided by the user 105 differs from the potential labels of the first example prediction (e.g., based on "[last name, 25]" not having the highest confidence value for the first example prediction). An additional example of performing the comparison based on the first example prediction's confidence value may include applying a confidence threshold to the potential labels. Under this additional example, a label provided by the user 105 matches only if the label is found in the prediction and has a confidence value greater than a threshold confidence value. Another additional example of performing the comparison based on the first example prediction's confidence value may include applying a rank threshold to the potential labels. Under this additional example, if the prediction includes 5 potential labels and the rank threshold is 3, a label provided by the user 105 matches only if the label is found in the first example prediction and has a confidence value among the 3 highest confidence values for the first example prediction. Additional examples of performing the comparison based on the first example prediction's confidence values may include filtering the potential labels by requiring the potential labels to be within a particular Z-score before comparing to the label provided by the user 105, filtering the potential labels by requiring the potential labels to be within one or more standard deviations from each other before comparing to the label provided by the user 105, or a combination of any of the above-mentioned examples.

Based on determining to stop the iterative training process for the model 115, the server 110 may stop the iterative training process of the model 115, stop the user-based labeling process, and may begin a user-based model accuracy process. This transitions between processes may be performed seamlessly to the user. Further, this transition may include stopping the manual labeling of the data samples 103 and starting an automated labeling of the data samples 103. In this way, the user 105 may stop manually providing labels for the data samples 103 and, based on the server 110 continuing the process for predicting labels for additional sets of the data samples 103, the model 115 may be used to provide predicted labels for the data samples 103. If the user 105 is in the middle of labeling a set of data samples 103 the server 110 may begin the user-based model accuracy process at the first data sample the user has not labeled. For example, if the user 105, as part of the user-based labeling process, has labeled 12 of the 25 emails in the third set 103-3 of the data samples, the server 110 may begin the user-based model accuracy process at the 13th email of the third set 103-3. This user-based model accuracy process may determine, based on input from the user 105, whether the model 115 is accurate. In this way, the user-based model accuracy process may be used as a way to determine whether to continue the automated labeling of the data samples 103.

Figure 3B:

The user-based model accuracy process is illustrated at FIGS. 3B and 3C, which depict example graphical interfaces 310 and 315. Graphical interfaces 310 and 315 may be configured to allow the user 105 to provide indications as to whether the predicted labels generated by the model 115 are correct or incorrect. As depicted in FIG. 3B, the graphical interface 310 indicates, via boxes surrounding the text, portions of the data sample that are associated with predicted labels generated by the model 115. Indication 311 indicates that the model 115 has a predicted label for the text "RTB@third-email-domain.com". The graphical interface 310 also provides a prompt 312 that indicates a predicted label of "email address" and includes buttons for the user 105 to indicate whether the predicted label is incorrect or correct. In the example provided in FIG. 3B, the user 105 is about to press, via pointer 313, the button to indicate the predicted label of "email address" is correct.

As depicted in FIG. 3C, the graphical interface 315 may be displayed after the user 105 presses the button to indicate the predicted label of "email address" is correct. Similar to the graphical interface 310, the graphical interface 315 indicates, via boxes surrounding the text, portions of the data sample that are associated with predicted labels generated by the model 115. Indication 316 indicates that the model 115 has predicted a label for the text "444-444-4444". The graphical interface 315 also provides a prompt 317 that indicates a predicted label of "account number" and includes buttons for the user 105 to indicate whether the predicted label is incorrect or correct. In the example provided in FIG. 3C, the user 105 is about to press, via pointer 318, the button to indicate the predicted label of "account address" is incorrect.

The example graphical interfaces 310 and 315 of FIGS. 3B and 3C are only two examples of the types of interfaces that could be used in connection with the user-based model accuracy process. For example, the example graphical interfaces 310 and 315 respectively show a single predicted label in the prompts 312 and 317. The single predicted label could be selected based on which potential label has the highest confidence value. Alternatively, the prompts 312 and 317 could include indications of multiple potential labels. For example, the prompt 317 may include, for the text "444-444-4444", an indication that potential labels include "account number" and "phone number". The user 105, in some examples with prompts showing multiple potential labels, may indicate whether any of the shown potential labels is the correct label. In an example where the prompt 317 includes, for the text "444-444-4444", an indication that potential labels include "account number" and "phone number", the user 105 may indicate that the predicted label is correct based on the inclusion of "phone number". The number of potential labels that are shown in a prompt may be based on a displayed number threshold (e.g., three or fewer potential labels are shown); based on filtering the potential labels by requiring the potential labels to be within a particular Z-score; based on filtering the potential labels by requiring the potential labels to be within one or more standard deviations from each other, or a combination of any of the above.

In view of the illustrations provided by FIGS. 3B and 3C, the user 105 may, as part of the user-based model accuracy process, input or otherwise indicate whether predicted labels generated by the model 115 are incorrect or correct. Based on the input provided by the user 105, the server 110 may determine whether the model 115 satisfies an accuracy threshold. For example, this determination may be performed based on an error count that indicates how many times the user 105 has indicated a predicted label is incorrect over a threshold number of data samples (e.g., count the number of times the user 105 indicates a predicted label is incorrect over 25 data samples). If the error count is greater than a threshold number (e.g., if the user 105 indicates a predicted label is incorrect more than 10 times over 25 data samples), the server 110 may determine that the model 115 does not satisfy the accuracy threshold. Otherwise, the server 110 may determine that the model 115 does satisfy the accuracy threshold. As another example, the determination as to whether the model 115 satisfies an accuracy threshold may be performed based on an error rate of the predicted labels over a threshold number of data samples. The error rate may take the form of a percentage (e.g., a percentage resulting from dividing the number of correct predicted labels or incorrect predicted labels by the total number of predicted labels for 25 data samples). If the percentage satisfies an error rate threshold, the server 110 may determine that the model 115 does not satisfy the accuracy threshold. Otherwise, the server 110 may determine that the model 115 does satisfy the accuracy threshold. As a particular example, if the percentage results from dividing the number of correct predicted labels by the total number of predicted labels for 25 data samples, the server 110 may determine the model 115 does not satisfy the accuracy threshold if the percentage is less than 97%. In this example, the model 115 does not satisfy the accuracy threshold because the error rate is greater than 3%. Otherwise, the server 110 may determine that the model 115 does satisfy the accuracy threshold. The above discussion of an error rate is only one of the statistical analyses that could be used to determine whether the model 115 satisfies an accuracy threshold. Another example of a statistical analysis that could be used to determine whether the model 115 satisfies an accuracy threshold includes an F-score. Further, the statistical analyses may be performed over all predicted labels (e.g., an error rate of all predicted labels over the threshold number of data samples) or on a label specific basis (e.g., an error rate for each different predicted label over the threshold number of data samples including, for example, an error rate for the label "email address" over the threshold number of data samples and an error rate for the label "first name" over the threshold number of data samples).

Based on the user-based model accuracy process, if the server 110 determines that the model 115 does not satisfy the accuracy threshold, the server 110 may take action in an attempt to increase the accuracy of the model 115. For example, the server 110 may re-start the iterative training process to further train the model 115. Alternatively, the server 110 may store a copy of the model 115 for later analysis, re-initialize the model 115 to an initial state, and re-start the iterative training process to begin training the model 115 anew.

Based on the user-based model accuracy process and if the server 110 determines that the model 115 does satisfy the accuracy threshold, the server 110 may perform a process for determining synthetic data samples. The process for determining synthetic data samples may include providing, as input to the synthetic data generator 120, one or more predicted labels generated by the model 115. Depending on the configuration of the synthetic data generator 120, a modified data sample 125 or some other suitable template for a synthetic data sample may also be provided as input to the synthetic data generator 120. The modified data sample 125 may be any one of the modified data samples generated in connection with modifying any of the three sets 103-1, 103-2, and 103-3 of the data samples 103, and may be similar to the either of the two example modified data samples 210 and 225 discussed in connection with FIGS. 2A and 2B. A template may be pre-generated for a particular format of data (e.g., a template for email data, a template for call record data) and may be configured to provide a basic structure for synthetic data samples (e.g., a template for email data may include first text indicative of text found in a header of an email and second text indicative of body text for the body of the email). Based on the received input, the synthetic data generator may generate one or more synthetic data samples 130. The one or more synthetic data samples 130 may be used as a basis for training another machine-learning model (not shown), used as a basis for validating another machine learning model (not shown), and/or stored in a repository for later use (not shown). Additionally, because confidential information may have been removed from the modified data sample based on its generation, the synthetic data sample may be accessed, and/or used without needing to enforce any confidentiality procedure associated with confidential information.

The server 110 may stop the user-based model accuracy process. For example, if the server 110 determines that the model 115 is determined to be accurate at less than a threshold error rate for a threshold number of consecutive sets of data samples (e.g., less than 1% error rate for 5 consecutive sets of data samples), the user-based model accuracy process may be stopped such that the user is no longer prompted to indicate correct and/or incorrect labels. Alternatively, the threshold may be based on a raw number of data samples instead of consecutive sets (e.g., less than a 1% error rate for 100 consecutive data samples). The above discussion of an error rate is only one of the statistical analyses that could be used to determine whether to stop the user-based model accuracy process. Another example of a statistical analysis that could be used to determine whether to stop the user-based model accuracy process includes an F-score. Further, the statistical analyses may be performed over all predicted labels (e.g., an error rate of all predicted labels over the threshold number of data samples) or on a label specific basis (e.g., an error rate for each different predicted label over the threshold number of data samples including, for example, an error rate for the label "email address" over the threshold number of data samples and an error rate for the label "first name" over the threshold number of data samples).

Figure 2D:
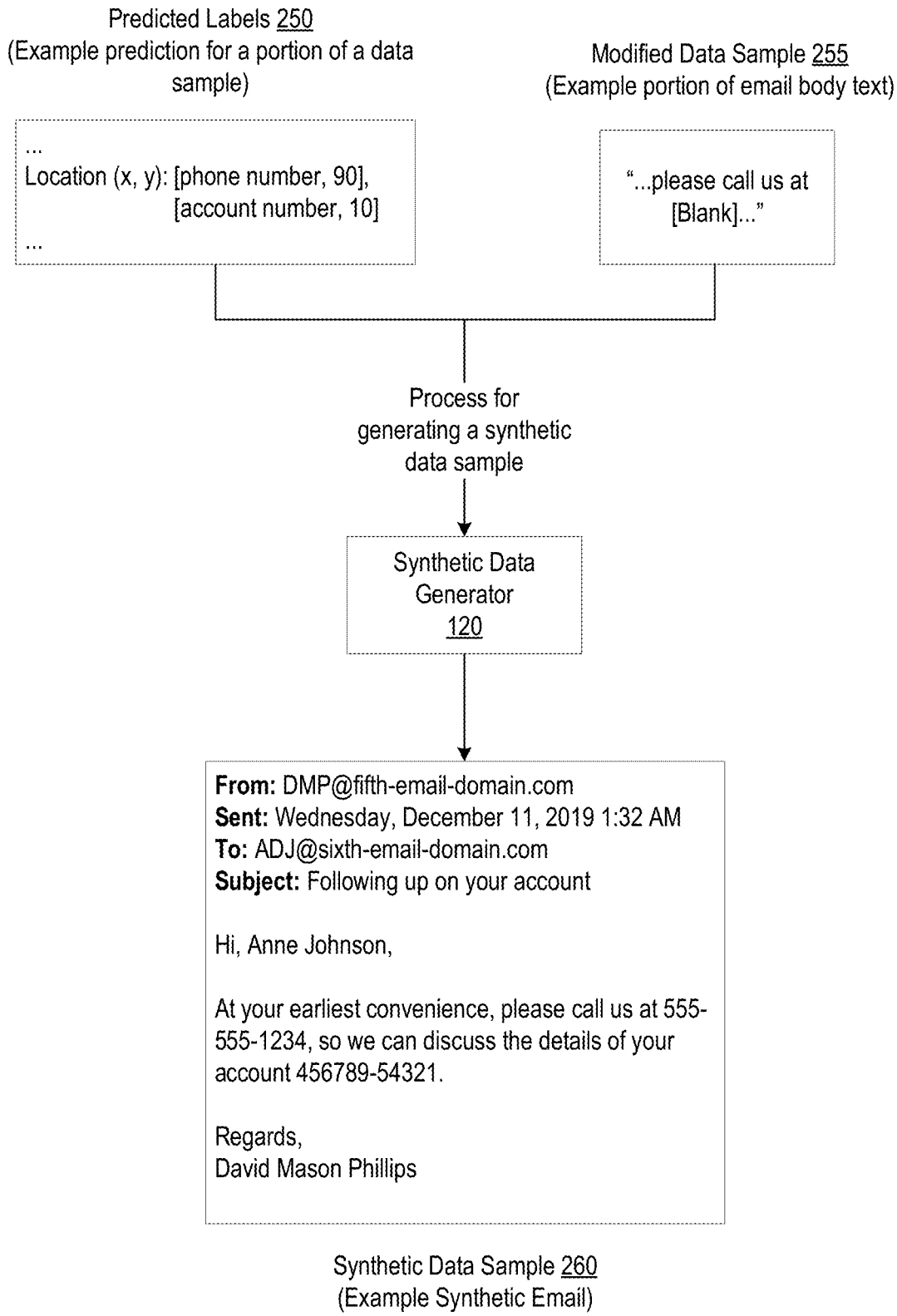

An illustration of using the synthetic data generator 120 to generate a synthetic data sample is provided in FIG. 2D. As depicted in FIG. 2D, the synthetic data generator 120 receives, as input, predicted labels 250 and a modified data sample 255. FIG. 2D shows, as part of the predicted labels 250, an example prediction that is in a format similar to what is shown in FIG. 2C. Specifically, the example prediction of FIG. 2D is "Location (x, y): [phone number, 90], [account number, 10]". FIG. 2D also shows, as part of the modified data sample, an example portion of email body text that includes an encoding similar to what is shown in FIG. 2B. The synthetic data generator 120 may process the received predicted labels 250 and the modified data sample 255, and may generate a synthetic data sample 260. As depicted in FIG. 2D, the synthetic data sample 260 is an example synthetic email that includes data different from the other example emails discussed in connection with the data samples and the modified data samples of FIGS. 2A-2D.

A user-based synthetic data accuracy process may be performed for the synthetic data sample 260. In this way, the user 105 may be prompted to determine whether the synthetic data sample 260 is correct or incorrect. The user 105 may indicate whether the synthetic data sample 260 is correct if the user 105 finds the synthetic data sample 260 indistinguishable, or nearly so, from the data samples 103. The user 105 may indicate the synthetic data sample 260 is incorrect if the user 105 finds the synthetic data sample distinguishable from the data samples 103.

An example in connection with the user-based synthetic data accuracy process is illustrated at FIG. 3D, which depicts an example graphical interface 320 that is configured to allow the user 105 to provide indications as to whether the synthetic data sample 260 is correct or incorrect. As depicted in FIG. 3D, the graphical interface 320 includes a display of synthetic email data and includes a prompt for the user 105 to indicate whether the synthetic email data is correct or incorrect. The user 105, via the pointer 325, is about to press the button to indicate the synthetic email data is correct. In this way, the user 105 may be indicating that the synthetic email data is indistinguishable, or nearly so, from email data included by the data samples 103. The synthetic email data may differ from the email data included by the data samples 103 in one or more ways, and the user 105 may still indicate the synthetic email data is correct. As one example, the account number may be in a different format from the email data included by the data samples 103.

Having discussed the example computing environment 100 of FIG. 1, example flows and methods, which may be performed by various devices of the example computing environment 100, will be discussed. To illustrate the model, synthetic data generator, and various devices in practice, an example flow will be discussed in connection with FIGS. 4A-4D. FIGS. 4A-4D depicts an example flow that includes a user 401 that is able to interact and view the displays of computer 403. Server 405 is in communication with the computer 403, the model 407, and the synthetic data generator 409. Mapping the process flow of FIGS. 4A-4D into the example computing environment 100 of FIG. 1, the user 401 may be the user 105 of FIG. 1, the computer 403 may be the user computing device 113, the server 405 may be the server 110, the model 407 may be the model 115, and the synthetic data generator 409 may be the synthetic data generator 120. Additional mappings to the depictions of FIGS. 1, 2A-2D, and 3A-3D will be provided as the example process flow of FIGS. 4A-4D is discussed. In general, the example process flow provides an example of what may occur as the various processes depicted in FIG. 1 are performed. For example, the example process flow depicts what may occur as, among other things, the user-based labeling process, the iterative training process, the one or more processes for modifying data samples, the process for predicting labels for additional sets of the data samples, the user-based model accuracy process, and the process for determining synthetic data samples are performed. The example flow illustrates the seamless transition between the various processes depicted in FIG. 1. Further, the example flow illustrates the parallel nature of the various processes depicted in FIG. 1. For example, as the computer 403 displays interfaces for the user 401 to interact with, the server 405 may be performing other processes such as a process for modifying one or more data samples and/or initiating an iterative training process for the model 407.

The example process flow begins at 410, where the server 405 may receive a first set of data samples (e.g., first set 103-1 of FIG. 1). At 415, the server 405 may cause display of a first user interface configured to allow the user 401 to indicate a first set of labels for the first set of data samples (e.g., performed as part of the user-based labeling process for the first set 103-1). Consequently, the computer 403, as shown at 417, may display a first user interface that allows the user 401 to indicate the first set of labels (e.g., similar to graphical user interface 305 of FIG. 3A). At 419, the user 401 may interact with the first user interface to indicate the first set of labels for the first set of data samples. As a result of the user 401 interacting with the first user interface, the server 405, as shown at 420, may receive, from the computer 403, an indication of one or more first portions that are to be labeled (e.g., the one or more first portions may include a first portion based on indication 306 of FIG. 3A). As a further result of the user 401 interacting with the first user interface, the server 405 may, as shown at 425, may receive, from the computer 403, the first set of labels for the first set of data samples (e.g., the first set of labels may include "email address" as shown at 304 of FIG. 3A).

The example flow continues at 430, where the server 405 may receive a second set of data samples (e.g., second set 103-2 of FIG. 1). At 430, the server 405 may cause display of a second user interface configured to allow the user 401 to indicate a second set of labels for the second set of data samples (e.g., performed as part of the user-based labeling process for the second set 103-2). Consequently, the computer 403, as shown at 437, may display the second user interface that allows the user 401 to indicate the second set of labels (e.g., similar to graphical user interface 305 of FIG. 3A, except displaying one or more data samples of the second set 103-2). At 439, the user 401 may interact with the second user interface to indicate the second set of labels for the second set of data samples. As a result of the user 401 interacting with the second user interface, the server 405, as shown at 445, may receive, from the computer 403, an indication of one or more second portions that are to be labeled. As a further result of the user 401 interacting with the second user interface, the server 405 may, as shown at 450, may receive, from the computer 403, the second set of labels for the second set of data samples.

As the computer 403 is displaying the second user interface, the server 405 may remove the one or more first portions from the first set of data samples (e.g., performed as part of a process for modifying the first set 103-1, as discussed in connection with FIG. 1). In connection with removing the one or more first portions from the first set of data samples, the server 405 may insert one or more first encodings in place of the one or more first portions. The one or more first encodings may be based on the first set of labels. As a result, the server 405 may generate a modified first set of data samples (e.g., each modified data sample in the modified first set may be similar to the example modified data sample 210 of FIG. 2A or the additional example modified data sample 225 of FIG. 2B). The modified first set of data samples may be associated with additional data including one or more listings of labels for the modified first set of data samples (e.g., similar to the set of labels 230 of FIG. 2B).

Figure 4A:
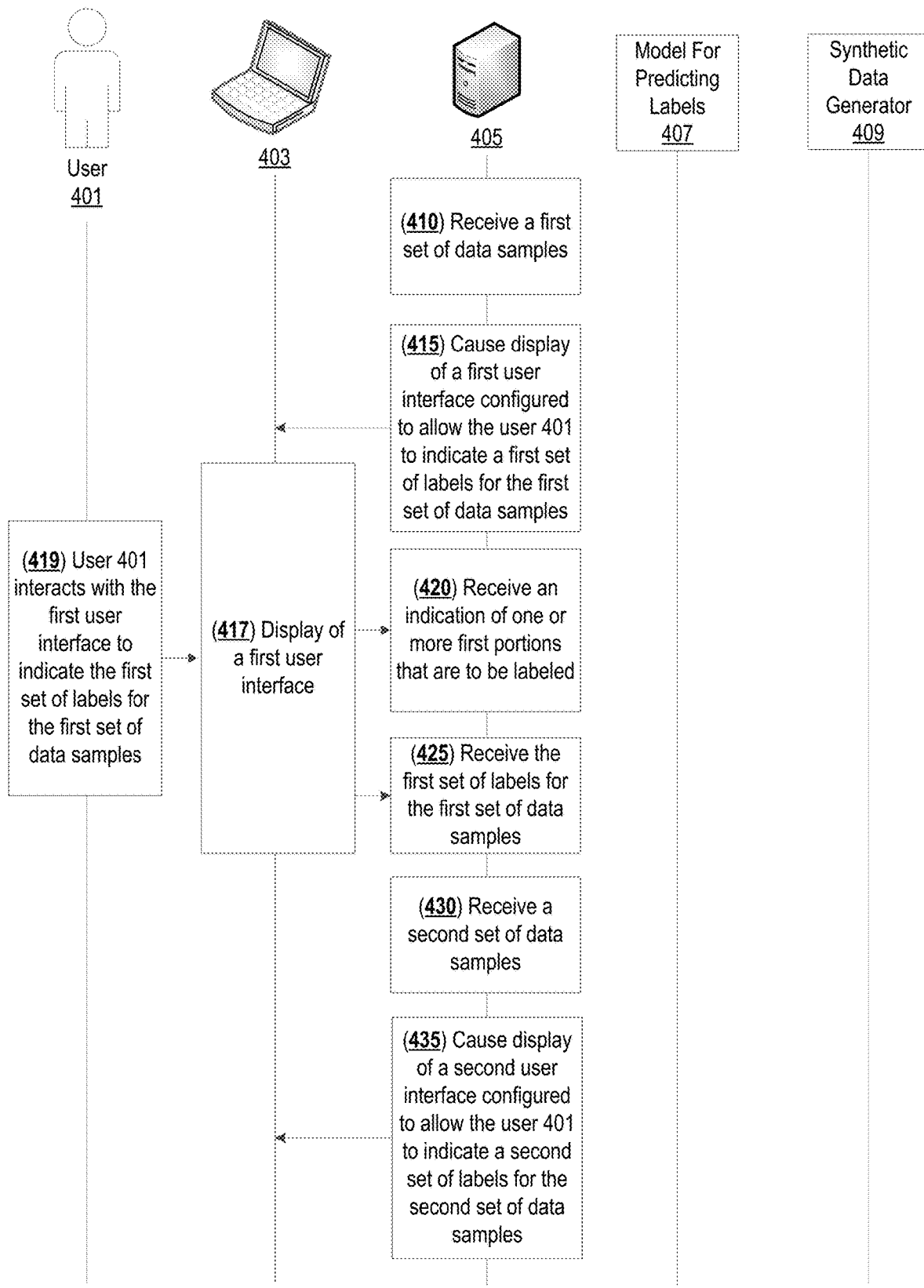
FIGS. 4A-4D depict an example process flow where data is labeled, a machine-learning model is trained, and synthetic data is generated in accordance with various aspects described herein.
Figure 4B:
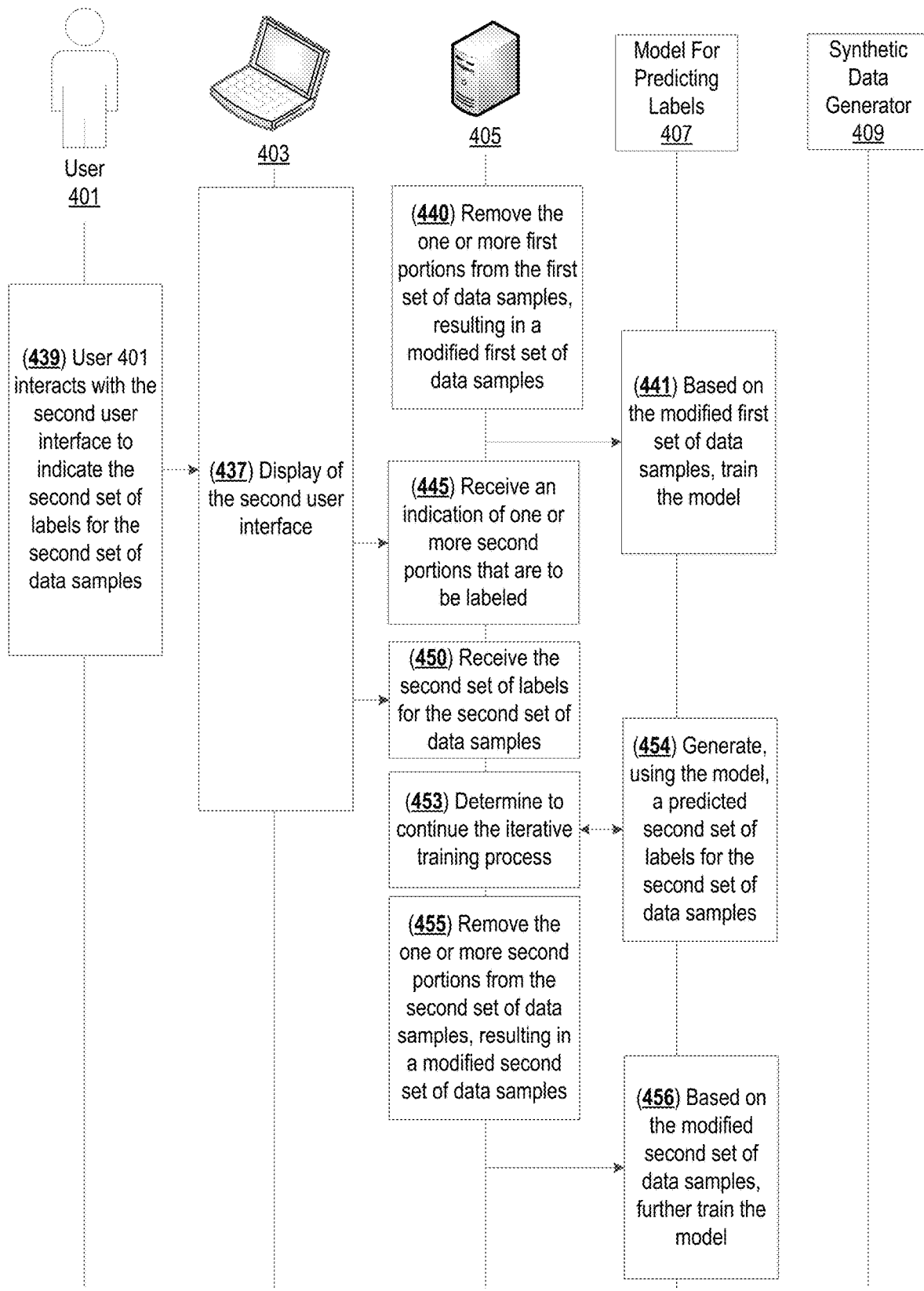

At 441, the model 407 may be trained based on the modified first set of data samples (e.g., performed as a first iteration of the iterative training process shown in FIG. 1). At 453, the server 405 may determine to continue the iterative training process for the model 407 (e.g., as a result of determining whether to stop or continue the iterative training process, as discussed in connection with FIG. 1). To form this determination, the server 405 may have compared the second set of data samples to a predicted second set of labels that were generated by the model 407 (e.g., similar to the comparisons discussed in connection with FIG. 1). In this way, the model 407 is shown, at 454, as generating the predicted second set of labels for the second set of data samples at a time prior to the determination to continue the iterative training process (e.g., FIG. 4B depicts the beginning of the block for 454 higher than the beginning of the block for 453). The predicted second set of labels may include predicted labels similar to those discussed in connection with FIGS. 2C and 2D.

At 455, the server 405 may remove the one or more second portions from the second set of data samples (e.g., performed as part of a process for modifying the second set 103-2). In connection with removing the one or more second portions from the second set of data samples, the server 405 may insert one or more second encodings in place of the one or more second portions. The one or more second encodings may be based on the second set of labels. As a result, the server 405 may generate a modified second set of data samples (e.g., each modified data sample in the modified second set may be similar to the example modified data sample 210 of FIG. 2A or the additional example modified data sample 225 of FIG. 2B). The modified second set of data samples may be associated with additional data including one or more listings of labels for the modified second set of data samples (e.g., similar to the set of labels 230 of FIG. 2B). At 456 and based on the server 405 determining to continue the iterative training process, the model 407 may be further trained based on the modified second set of data samples (e.g., performed as a second iteration of the iterative training process).

The example flow continues at 460, where the server 405 may receive a third set of data samples (e.g., third set 103-3 of FIG. 1). At 461, the server 405 may cause display of a third user interface configured to allow the user 401 to indicate a third set of labels for the third set of data samples (e.g., performed as part of the user-based labeling process for the third set 103-3). Consequently, the computer 403, as shown at 463, may display the third user interface that allows the user 401 to indicate the third set of labels (e.g., similar to graphical user interface 305 of FIG. 3A, except displaying one or more data samples of the third set 103-3). At 464, the user 401 may interact with the third user interface to indicate the third set of labels for the third set of data samples. As a result of the user 401 interacting with the third user interface, the server 405, as shown at 467, may receive, from the computer 403, an indication of one or more third portions that are to be labeled. As a further result of the user 401 interacting with the third user interface, the server 405 may, as shown at 467, may receive, from the computer 403, the third set of labels for the third set of data samples.

Figure 4C:
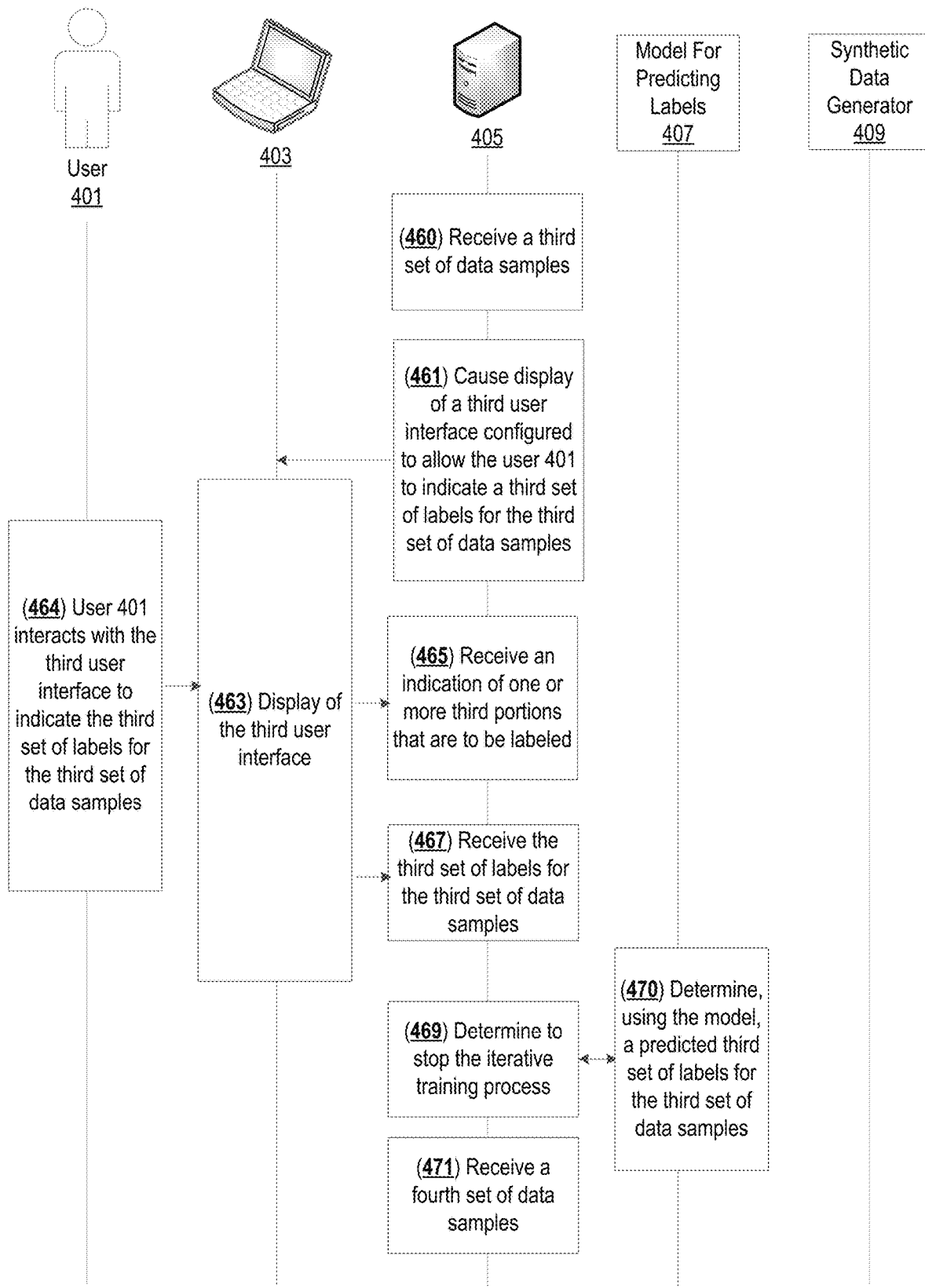
Figure 4D:
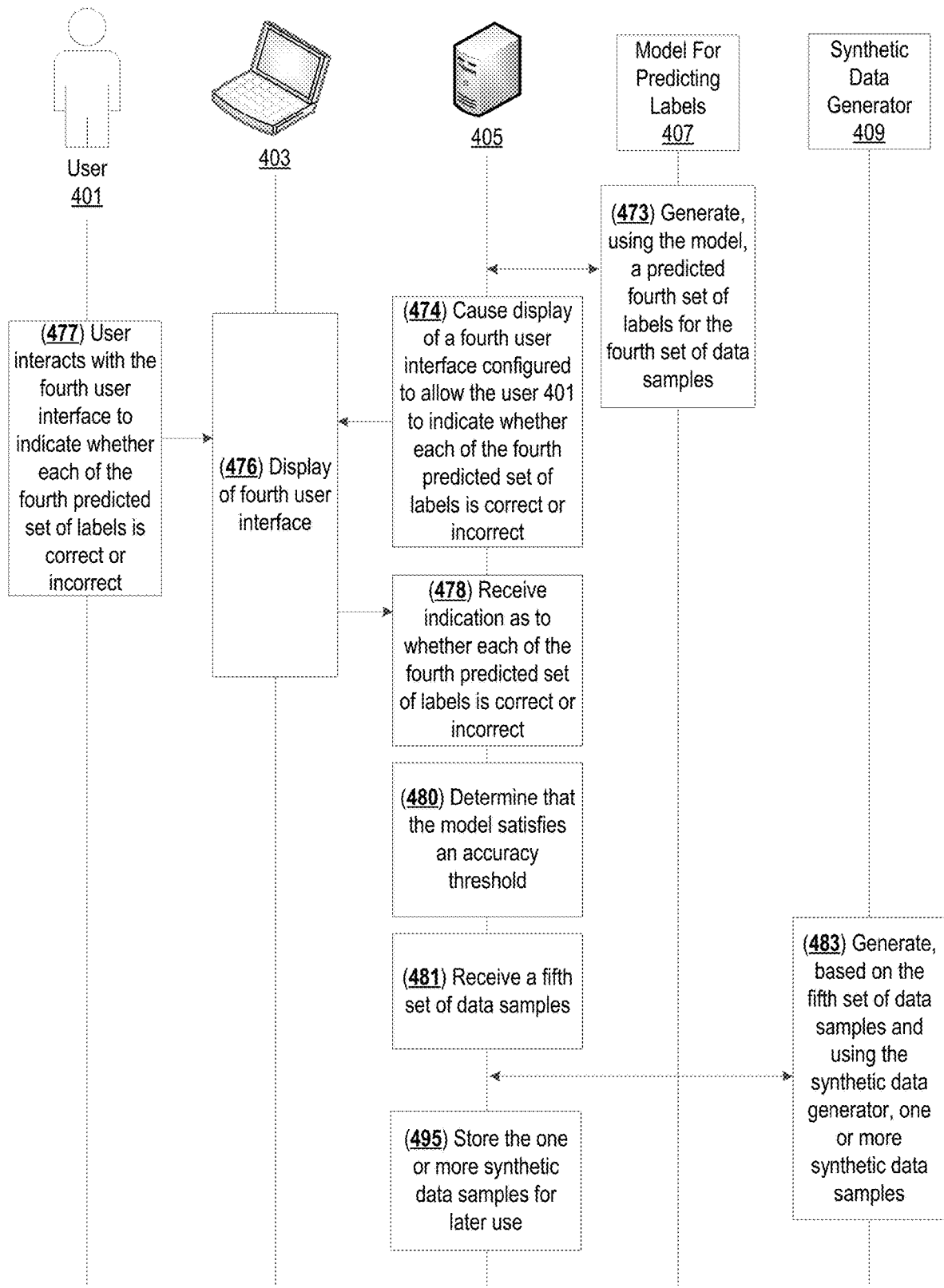

At 469, the server 405 may determine to stop the iterative training process for the model 407 (e.g., as a result of determining whether stop or continue the iterative training process, as discussed in connection with FIG. 1). To form this determination, the server 405 may have compared the third set of data samples to a predicted third set of labels that were generated by the model 407 (e.g., similar to the comparisons discussed in connection with FIG. 1). In this way, the model 407 is shown, at 470, as generating the predicted third set of labels for the third set of data samples at a time prior to the determination to stop the iterative training process (e.g., FIG. 4C depicts the beginning of the block for 470 higher than the beginning of the block for 469). The predicted third set of labels may include predicted labels similar to those discussed in connection with FIGS. 2C and 2D.

The example flow continues at 471, where the server 405 may receive a fourth set of data samples. Based on the server 405 having previously determined to stop the iterative training process, the model 407, as shown at 473, may generate a predicted fourth set of labels for the fourth set of data samples. The predicted fourth set of labels may include predicted labels similar to those discussed in connection with FIGS. 2C and 2D. At 474, the server 405 may cause display of a fourth user interface configured to allow the user 401 to indicate whether the fourth predicted set of labels is correct or incorrect (e.g., performed as part of the user-based model accuracy process discussed in connection with FIG. 1). Consequently, the computer 403, as shown at 476, may display the fourth user interface (e.g., similar to the graphical user interfaces 310 and 325 of FIGS. 3B and 3C). At 477, the user 401 may interact with the fourth user interface to indicate whether each of the fourth predicted set of labels is correct or incorrect. As a result of the user 401 interacting with the fourth user interface, the server 405, as shown at 478, may receive, from the computer 403, an indication as to whether each of the fourth predicted set of labels is correct or incorrect. At 480, the server 405 may determine that the model 407 satisfies an accuracy threshold (such as a result of completing user-based the model accuracy process as discussed in connection with FIG. 1). This determination, for example, could be based on the error rate for the predicted fourth set of labels satisfying an error rate threshold. For example, based on the indication as to whether each of the predicted fourth set of labels is correct or incorrect, the server 405 may determine an error rate for the predicted fourth set of labels (e.g., a percentage of correct predicted labels divided by the total number of predictions in the predicted fourth set of labels). If the error rate is less than an error rate threshold, the server 405 may determine that the model satisfies the accuracy threshold (e.g., if the error rate is less than 3%, the model may satisfy the accuracy threshold).

The example flow continues at 481, where the server 405 may receive a fifth set of data samples. Based on the server 405 having previously determined the model satisfies an accuracy threshold, the model 407 may, as shown at 483, generate one or more synthetic data samples based on the fifth set of data samples (e.g., as part of performing the process for generating synthetic data samples, as discussed in connection with FIG. 1). The one or more synthetic data samples may include synthetic data similar to those discussed in connection with FIG. 2D. At 495, the server 405 may store the one or more synthetic data samples for later use (e.g., for training another machine-learning model, for validating another machine-learning model, and/or as part of a repository for synthetic data). The server 405 may also use the one or more synthetic data samples as part of a user-based synthetic data accuracy process (e.g., as discussed in connection with FIG. 1 and using a graphical interface similar to the depiction of FIG. 3D).

In view of the example flow of FIGS. 4A-4D, the server 405 may manage the progression through the various stages from the user 401 manually labeling the data samples, to training the model 407, to determining whether the model 407 satisfies an accuracy threshold, and to using the model 407 to generate synthetic data.

Figure 5:
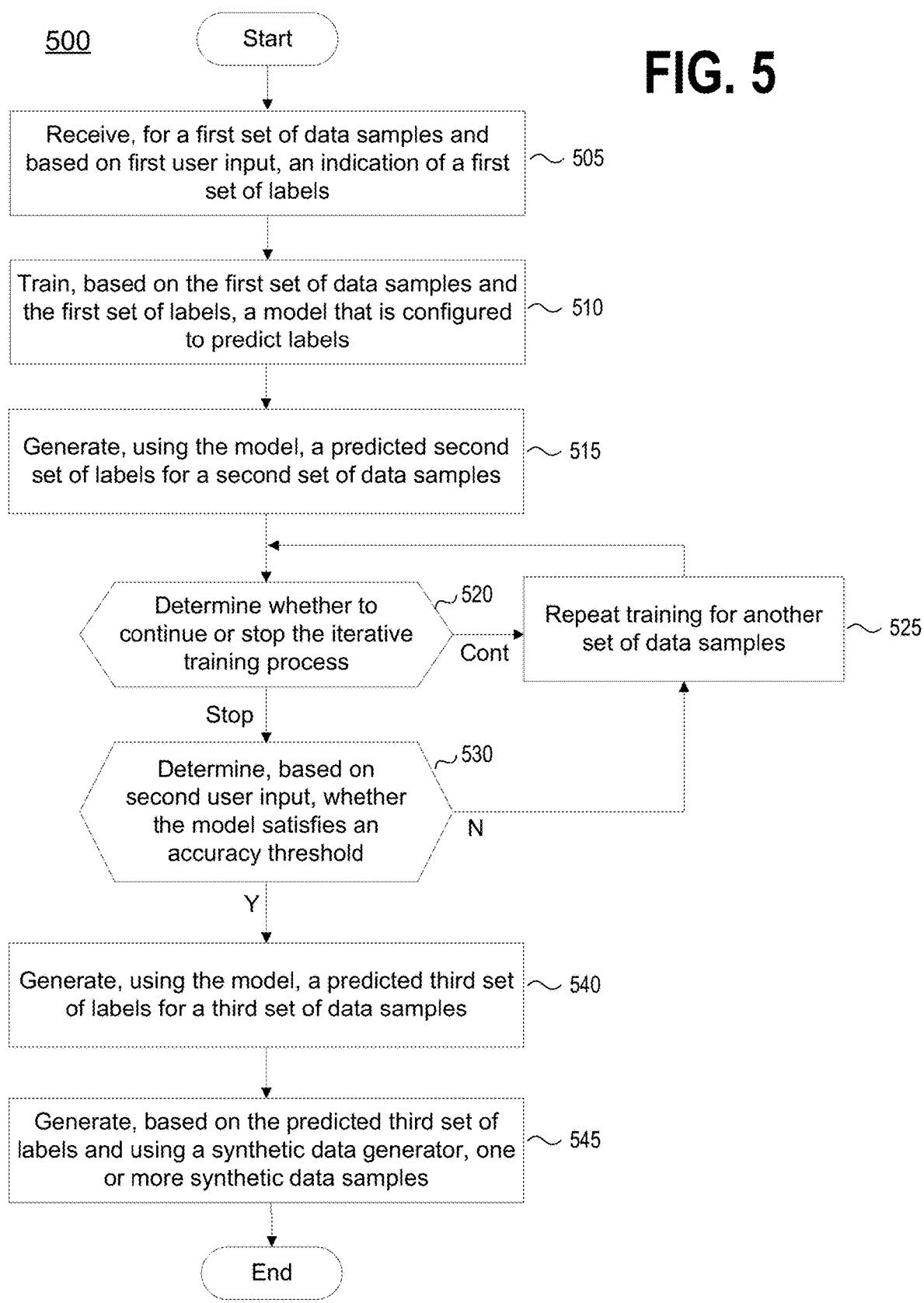
FIG. 5 depicts an example method for labeling data, training a machine-learning model, and generating synthetic data in accordance with various aspects described herein.

FIG. 5 depicts an example method 500 that may be performed by a computing device that is configured to operate the same as, or similar to, the server 405. As server 405 may be mapped to the server 110 of FIG. 1, additional mappings to the depictions of FIGS. 1, 2A-2D, 3A-3D, and 4A-4D will be provided as the example method 500 of FIG. 5 is discussed. In this way, method 500 may be performed by any computing device configured to operate the same as, or similar to, the server 110 of FIG. 1. Method 500 may be implemented in suitable computer-executable instructions.

The method 500 may be viewed as having different branches that reflect the transition between the processes described in connection with the example computing environment 100 of FIG. 1. For example, steps 505-525 of the example method 500 may represent a branch where a user manually provides labels for data samples based on, for example, an ongoing user-based data labeling process. Step 530 may represent a branch where the user may no longer manually labels data samples based on, for example, an ongoing user-based model accuracy process. Steps 540 and 545 may represent a branch where synthetic data may be generated based on, for example, an ongoing process for generating synthetic data samples. If the user-based model accuracy process and the process for generating synthetic data samples are being performed in a parallel with each other, steps 530-545 may together represent one or more branches where the user may no longer manually labels data samples and synthetic data may be generated based on, for example, an ongoing user-based model accuracy process and an ongoing process for generating synthetic data samples.

At step 505, a computing device may receive, for a first set of data samples and based on first user input, an indication of a first set of labels. The indication of the first set of labels may be based on performing a user-based labeling process where a user manually indicates, via a graphical interface, the first set of labels. The user-based labeling process was discussed above in connection with FIG. 1 and FIGS. 4A-4C. A graphical interface that allows a user to indicate the first set of labels may be similar to graphical interface 305 of FIG. 3A.

At step 510, the computing device may train, based on the first set of data samples and the first set of labels, a model that is configured to predict labels. The training of this step may be a first iteration of an iterative training process. The iterative training process was discussed in connection with FIG. 1 and FIGS. 4A-4C. Additionally, training the model may be performed in a way that does not directly use the first set of data samples in the training process. For example, the computing device may generate a modified first set of data samples based on the first set of the data samples and the first set of labels. Each modified data sample of the modified first set may be similar to the example modified data sample 210 of FIG. 2A or the additional example modified data sample 225 of FIG. 2B. Each modified data sample of the modified first set may be associated with additional data, including data similar to the set of labels 230 of FIG. 2B. The model may be trained using the modified data samples of the modified first set and/or the additional data. In this way and by using the modified first set of data samples, the model 115 is trained based on the first set of data samples and the first set of labels without directly using the first set of data samples. The model may be the same or similar to the model 115 discussed in connection with FIG. 1.

At step 515, the computing device may generate, using the model, a predicted second set of labels for a second set of data samples. Generating the predicted second set of labels may be performed as part of a process for predicting labels for additional sets of the data samples. The process for predicting labels for additional sets of the data samples was discussed in connection with FIG. 1. The predicted second set of labels may include predicted labels similar to those discussed in connection with FIGS. 2C and 2D.

At step 520, the computing device may determine whether to continue or stop the iterative training process for the model. This determination may include comparing the predicted second set of labels with additional sets of labels provided by a user for the second set of data samples. Examples of such a comparison were discussed in connection with FIG. 1 and FIGS. 4A-4C. Moreover, based on the comparison, one or more counts may be determined. The one or more counts may indicate how many instances the predicted second set of labels differ from the additional sets of labels provided by the user and/or may indicate how many instances the predicted second set of labels match the additional sets of labels provided by the user 105. Determining whether to continue or stop the iterative training process for the model may be based on the one or more counts. Examples of the one or more counts were discussed in connection with FIG. 1. If the computing device determines to stop the iterative training process, the method may proceed to step 530, which begins the branch of the method 500 where the user may no longer manually labels data samples. If the computing device determines to continue the iterative training process, the method may proceed to step 525, which continues the branch of the method 500 where the user may manually label data samples.

At step 525, the computing device may repeat training of the model for another set of data samples. Repeating the training may include performing steps similar to steps 505-515 based on the other set of data samples. In this way, an indication of a set of labels for the other set of data samples may be received, the model may be trained based on the other set of data samples and the set of labels for the other set of samples, and a predicted set of labels for the other set of data samples may be generated.

At step 530, the computing device may determine, based on second user input, whether the model satisfies an accuracy threshold. This determination may be based on performing a user-based model accuracy process where a user indicates, via a graphical interface, whether predicted labels generated by the model are correct or incorrect. The user-based model accuracy process was discussed above in connection with FIGS. 1 and 4D. A graphical interface that allows a user to indicate whether predicted labels generated by the model are correct or incorrect may be similar to graphical interface 310 and 315 of FIGS. 3B and 3C. Additionally, this determination may be based on comparing an error count or a percentage that indicates an error rate to a threshold. This comparison of error counts and percentages to thresholds was discussed above in connection with FIGS. 1 and 4D. If the computing device determines that the model satisfies an accuracy threshold, the method may proceed to step 540, which begins the branch of the method 500 where synthetic data may be generated. If the computing device determines that the model does not satisfy an accuracy threshold, the method may proceed step 525, which rejoins the branch where the user may manually label data samples.

At step 540, the computing device may generate, using the model, a predicted third set of labels for a third set of data samples. Generating the predicted third set of labels may be performed as part of a process for predicting labels for additional sets of the data samples. The process for predicting labels for additional sets of the data samples was discussed in connection with FIG. 1. The predicted third set of labels may include predicted labels similar to those discussed in connection with FIGS. 2C and 2D.

At step 545, the computing device may generate, based on the predicted third set of labels and using a synthetic data generator, one or more synthetic data samples. The generation of the one or more synthetic data samples may be based on performing a process for generating synthetic data samples. The process for generating synthetic data samples was discussed in connection with FIG. 1. The one or more synthetic data samples may include synthetic data similar to those discussed in connection with FIG. 2D. The synthetic data generator may be the same as, or similar to, the synthetic data generator 120 of FIG. 1

The one or more synthetic data samples may be used for training another machine-learning model, for validating another machine-learning model, and/or as part of a repository for synthetic data. The one or more synthetic data samples may also be used as part of a user-based synthetic data accuracy process (e.g., similar to the discussion of FIG. 1 and using a graphical interface similar to the depiction of FIG. 3D). These uses of the one or more synthetic data samples may be performed by the computing device or another device.

Figure 6:
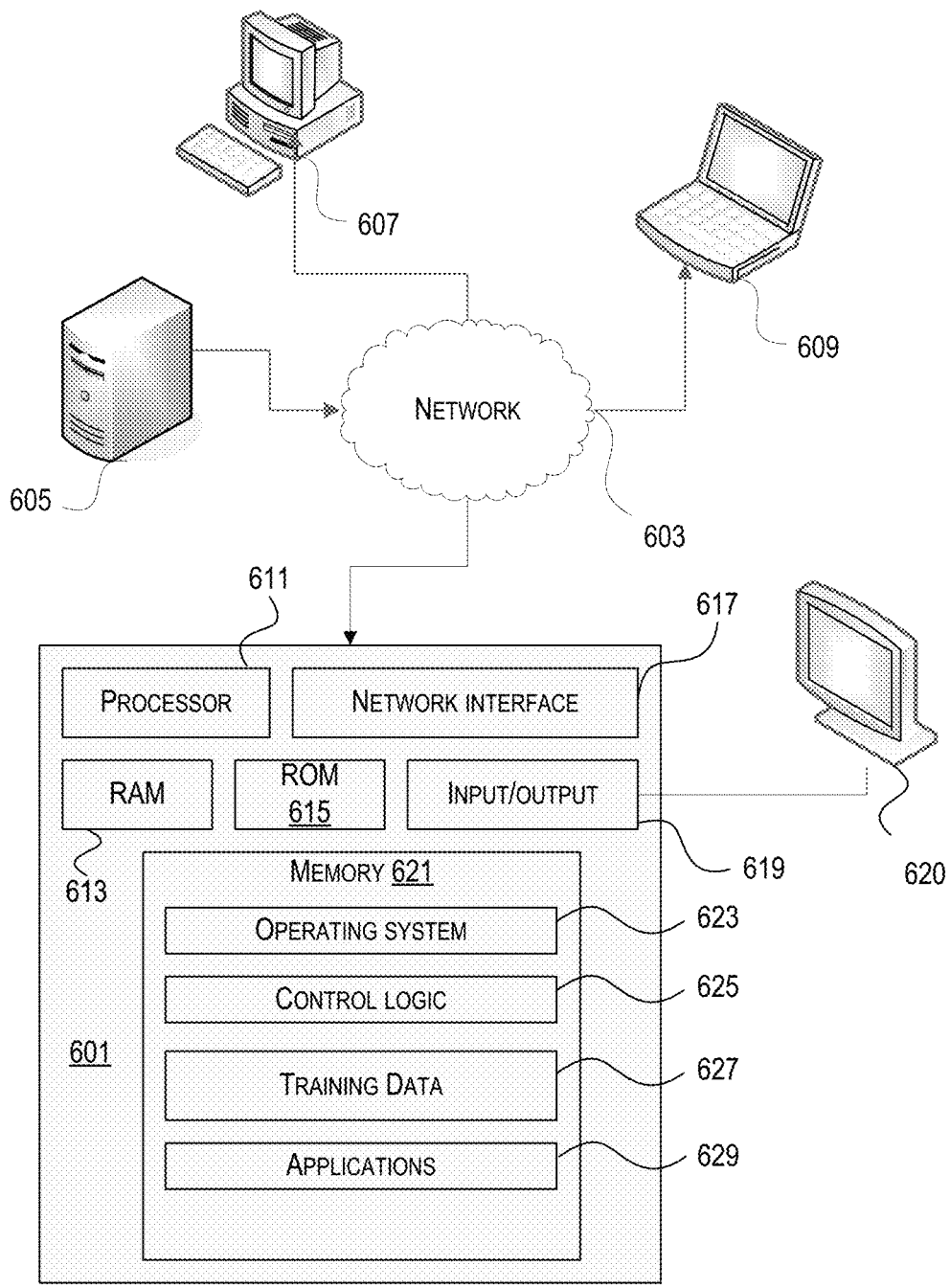
FIG. 6 depicts an example of a computing device that may be used in implementing one or more aspects described herein.

FIG. 6 illustrates one example of a computing device 601 that may be used to implement one or more illustrative aspects discussed herein. For example, the computing device 601 may implement one or more aspects of the disclosure by reading and/or executing instructions and performing one or more actions based on the instructions. The computing device 601 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 601 may operate in a standalone environment or a networked environment. As shown in FIG. 6, various network nodes 601, 605, 607, and 609 may be interconnected via a network 603, such as the Internet. Other networks may also or alternatively be used, including private intranets, corporate networks, LANs, wireless networks, personal networks (PAN), and the like. Network 603 is for illustration purposes and may be replaced with fewer or additional computer networks. A local area network (LAN) may have one or more of any known LAN topology and may use one or more of a variety of different protocols, such as Ethernet. Devices 601, 605, 607, 609 and other devices (not shown) may be connected to one or more of the networks via twisted pair wires, coaxial cable, fiber optics, radio waves or other communication media.

As seen in FIG. 6, the computing device 601 may include a processor 611, RAM 613, ROM 615, network interface 617, input/output interfaces 619 (e.g., keyboard, mouse, display, printer, etc.), and memory 621. Processor 611 may include one or more computer processing units (CPUs), graphical processing units (GPUs), and/or other processing units such as a processor adapted to perform computations associated with speech processing or other forms of machine learning. I/O 619 may include a variety of interface units and drives for reading, writing, displaying, and/or printing data or files. I/O 619 may be coupled with a display such as display 620. Memory 621 may store software for configuring computing device 601 into a special purpose computing device in order to perform one or more of the various functions discussed herein. Memory 621 may store operating system software 623 for controlling overall operation of the computing device 601, control logic 625 for instructing computing device 601 to perform aspects discussed herein, training data 627, and other applications 629. The computing device 601 may include two or more of any and/or all of these components (e.g., two or more processors, two or more memories, etc.) and/or other components and/or subsystems not illustrated here.

Devices 605, 607, 609 may have similar or different architecture as described with respect to computing device 601. Those of skill in the art will appreciate that the functionality of computing device 601 (or device 605, 607, 609) as described herein may be spread across multiple data processing devices, for example, to distribute processing load across multiple computers, to segregate transactions based on geographic location, user access level, quality of service (QoS), etc. For example, devices 601, 605, 607, 609, and others may operate in concert to provide parallel computing features in support of the operation of control logic 625.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the subject matter has been described in language specific to structural features and/or methodological acts, it is to be understood that the subject matter defined in any claim is not necessarily limited to the specific features or acts described above. Rather, the specific features and acts described above are disclosed as example forms of implementing any claim or any of the appended claims.

We claim:

1. A method comprising:
receiving, for each text document in a first set of text documents and based on first user input, an indication of a first set of labels, wherein a label indicates a location of confidential information in a text document and a type of the confidential information in the text document and wherein the first set of text documents is of a plurality of text documents;
modifying each document in the first set of text documents, wherein modifying a given first text document comprises redacting, based on one or more labels corresponding to the given first text document, confidential information from the given first text document;
based on the modified first set of text documents and the first set of labels, training a machine learning model to predict one or more labels based on an input text document, wherein predicting a label comprises predicting, for an input text document, a location of confidential information in the input text document and a type of the confidential information in the input text document;

predicting, using the machine learning model, a predicted set of labels for a second set of text documents, wherein the second set of text documents is of the plurality of text documents and wherein predicting a set of labels for a given second text document comprises predicting, for each label, a location of confidential information and a type of the confidential information in the given second text document;

receiving, for the second set of text documents and based on second user input, an indication of a second set of labels;

determining, based on the predicted set of labels and the second set of labels, that the machine learning model satisfies an accuracy threshold, wherein the accuracy threshold is a percentage indicating a degree of correlation between the predicted set of labels and the second set of labels;

predicting, using the machine learning model, a third set of labels for a third set of text documents, wherein the third set of text documents is of the plurality of text documents;

modifying each text document in the third set of text documents based on the third set of labels, wherein modifying a given third text document comprises redacting, based on one or more labels corresponding to the given third text document, confidential information from the given third text document; and based on the third set of labels and modified third set of text documents and using a synthetic data generator that is configured to generate synthetic data based on indications of labels, generating one or more synthetic text documents, wherein generating a synthetic text document based on a given third text document comprises:

for each label associated with the given third text document, inserting, into the given third text document at a location associated with the label, synthetic data, wherein the synthetic data is based on the type of confidential information associated with the label and replaces the redacted confidential information associated with the label in the given third text document.

2. The method of claim 1, wherein training the machine learning model is performed in parallel with display of an interface that enables a user to provide, via the second user input, an indication of a second set of labels for the second set of data samples.

3. The method of claim 2, wherein training the machine learning model is an iterative training process, and wherein the method further comprises:

continuing the iterative training process based the machine learning model failing to satisfy the accuracy threshold.

4. The method of claim 1, wherein the predicted set of labels includes, for a given second text document in the second set of text documents, one or more potential labels associated with a location in the given second text document and wherein a potential label has a corresponding confidence value;

wherein the second user input further comprises an indication whether the one or more potential labels is correct for the location; and wherein determining that the machine learning model satisfies the accuracy threshold is further based on:
the indication whether the one or more potential labels is correct for the location, and
whether the corresponding confidence value satisfies a second accuracy threshold.

5. The method of claim 1, wherein modifying a text document in the first set of text documents further comprises:

for each label of one or more labels associated with the text document, inserting, into the text document, one or more encodings at a location indicated by the label, and
wherein the one or more encodings are indicative of a type of confidential information indicated by the label.

6. The method of claim 1, wherein generating a synthetic text document further comprises:

receiving third user input that indicates, based on one or more labels associated with the synthetic text document, whether the one or more synthetic data are correct.

7. The method of claim 1, wherein the machine learning model comprises one or more of a transformer, a convolutional neural network, and a long short term memory (LSTM) network.

8. An apparatus comprising:
one or more processors; and
memory storing executable instructions that, when executed by the one or more processors, cause the apparatus to:
receive, for each text document in a first set of text documents and based on first user input, an indication of a first set of labels, wherein a label indicates a location of confidential information in the text document and a type of the confidential information in the text document and wherein the first set of text documents is of a plurality of text documents;
modify each text document in the first set of text documents, wherein modifying a given first text document comprises redacting, based on one or more labels corresponding to the given first text document, confidential information from the given first text document;
based on the modified first set of text documents and the first set of labels, train a machine learning model to predict one or more labels based on an input text document, wherein predicting a label comprises predicting, for an input text document, a location of confidential information in the input text document and a type of the confidential information in the input text document;
predict, using the machine learning model, a predicted set of labels for a second set of text documents, wherein the second set of text documents is of the plurality of text documents and wherein predicting a set of labels for a given second text document comprises predicting, for each label, a location of confidential information and a type of the confidential information in the given second text document;
receive, for the second set of text documents and based on second user input, an indication of a second set of labels;
determine, based on the predicted set of labels and the second set of labels, that the machine learning model satisfies an accuracy threshold, wherein the accuracy threshold is a percentage indicating a degree of correlation between the predicted set of labels and the second set of labels;

predict, using the machine learning model, a third set of labels for a third set of text documents, wherein the third set of text documents is of the plurality of text documents;

modify each text document in the third set of text documents based on the third set of labels, wherein modifying a given third text document comprises redacting, based on one or more labels corresponding to the given third text document, confidential information from the given third text document; and based on the third set of labels and modified third set of text documents and using a synthetic data generator that is configured to generate synthetic data based on indications of labels, generate one or more synthetic text documents, wherein generating a synthetic text document based on a given third document comprises:

for each label associated with the given third document, insert, into the given third document at a location associated with the label, synthetic data, wherein the synthetic data is based on the type of confidential information associated with the label and replaces the redacted confidential information associated with the label in the given third document.

9. The apparatus of claim 8, wherein the predicted set of labels includes, for a given second text document of the second set of text documents, one or more potential labels associated with a location in the given second text document and wherein a potential label has a corresponding confidence values; and wherein the second user input further comprises an indication whether the one or more potential labels is correct for the location; and wherein the executable instructions that, when executed by the one or more processors, cause the apparatus to determine that the machine learning model satisfies the accuracy threshold based on:

the indication whether the one or more potential labels is correct for the location, and whether the corresponding confidence value satisfies a second accuracy threshold.

10. The apparatus of claim 8, wherein the executable instructions to modify a text document in the first set of text documents, when executed by the one or more processors, further cause the apparatus to:

for each label of one or more labels associated with the text document, insert, into the text document, one or more encodings at a location indicated by the label, and where the one or more encodings are indicative of a type of confidential information indicated by the label.

11. The apparatus of claim 8, wherein the executable instructions to generate a synthetic text document, when executed by the one or more processors, further cause the apparatus to:

receive third user input that indicates, based on one or more labels associated with the synthetic text document, whether the one or more synthetic data are correct.

12. The apparatus of claim 8, wherein the machine learning model comprises one or more of a transformer, a convolutional neural network, and a long short term memory (LSTM) network.

13. The apparatus of claim 8, wherein the executable instructions to train the machine learning model, when executed by the one or more processors, cause the apparatus to display an interface that enables a user to provide, via the second user input, an indication of a second set of labels for the second set of data samples.

14. One or more non-transitory computer-readable media storing executable instructions that, when executed, cause one or more computing devices to:

receive, for each text document in a first set of text documents and based on first user input, an indication of a first set of labels, wherein a label indicates a location of confidential information in a text document and a type of the confidential information in the text document and wherein the first set of text documents is of a plurality of text documents;

modify each text document in the first set of text documents, wherein modifying a text document comprises redacting, based on one or more labels, confidential information from the text document;

based on the modified first set of the text documents and the first set of labels, train a machine learning model to predict one or more labels based on an input text document, wherein predicting a label comprises predicting, for an input text document, a location of confidential information in the input text document and a type of the confidential information in the input text document;

predict, using the machine learning model, a predicted set of labels for a second set of text documents, wherein the second set of text documents is of the plurality of text documents and wherein predicting a set of labels for a given second text document comprises predicting, for each label, a location of confidential information and a type of the confidential information in the given second text document;

receive, for the second set of text documents and based on second user input, an indication of a second set of labels;

determine, based on the predicted set of labels and the second set of labels, that the machine learning model satisfies an accuracy threshold, wherein the accuracy threshold is a percentage indicating a degree of correlation between the predicted set of labels and the second set of label;

predict, using the machine learning model, a third set of labels for a third set of text documents, wherein the third set of text documents is of the plurality of text documents; and based on the third set of text documents and modified third set of text documents and using a synthetic data generator that is configured to generate synthetic data based on indications of labels, generate one or more synthetic text documents, wherein generating a synthetic text document based on a given third text document comprises:

for each label associated with the given third text document, inserting, into the given third text document at a location associated with the label, synthetic data, wherein the synthetic data resembles a type of confidential information associated with the label and does not comprise confidential information.

15. The one or more non-transitory computer-readable media storing executable instructions of claim 14, that, when executed, cause the one or more computing devices to further train the machine learning model by:

displaying an interface that enables a user to provide, via the second user input, an indication of a second set of labels for the second set of data samples.

16. The one or more non-transitory computer-readable media storing executable instructions of claim 14, that, when executed, cause the one or more computing devices to further train the machine learning model by an iterative training process, and wherein training further comprises:
   continuing the iterative training process based the machine learning model failing to satisfy the accuracy threshold.

17. The one or more non-transitory computer-readable media storing executable instructions of claim 14, wherein the predicted set of labels includes, for a given second text document in the second set of text documents, one or more potential labels associated with a location in the given second text document and wherein a potential label has a corresponding confidence value;
   wherein the second user input further comprises an indication whether the one or more potential labels is correct for the location; and
   wherein the instructions, when executed, cause the one or more computing devices to further determine that the machine learning model satisfies the accuracy threshold is further based on:
   the indication whether the one or more potential labels is correct for the location, and whether the corresponding confidence value satisfies a second accuracy threshold.

18. The one or more non-transitory computer-readable media storing executable instructions of claim 14, that, when executed, cause one or more computing devices to further modify a text document in the first set of text documents by:
   for each label of one or more labels associated with the text document, inserting, into the text document, one or more encodings at a location indicated by the label, and
   wherein the one or more encodings are indicative of a type of confidential information indicated by the label.

19. The one or more non-transitory computer-readable media storing executable instructions of claim 14, that, when executed, cause one or more computing devices to further generate a synthetic text document by:
   receiving third user input that indicates, based on one or more labels associated with the synthetic text document, whether the one or more synthetic data are correct.

20. The one or more non-transitory computer-readable media storing executable instructions of claim 14, wherein the machine learning model comprises one or more of a transformer, a convolutional neural network, and a long short term memory (LSTM) network.

* * * * *